United States Patent
Zhu

(10) Patent No.: US 12,425,246 B2
(45) Date of Patent: Sep. 23, 2025

(54) CROSS-BLOCKCHAIN TRANSACTION PROCESSING METHOD AND APPARATUS, COMPUTER DEVICE, COMPUTER STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 254 days.

(21) Appl. No.: 18/340,954

(22) Filed: Jun. 26, 2023

(65) Prior Publication Data
US 2023/0353394 A1    Nov. 2, 2023

Related U.S. Application Data

(63) Continuation of application No. PCT/CN2022/122007, filed on Sep. 28, 2022.

(30) Foreign Application Priority Data

Nov. 15, 2021    (CN) .......................... 202111349928.7

(51) Int. Cl.
*H04L 9/40*    (2022.01)
*G06F 21/62*    (2013.01)
(Continued)

(52) U.S. Cl.
CPC ............ *H04L 9/50* (2022.05); *G06F 21/6218* (2013.01); *H04L 9/3247* (2013.01)

(58) Field of Classification Search
CPC ...... H04L 9/50; H04L 9/3247; G06F 21/6218
See application file for complete search history.

(56) References Cited

U.S. PATENT DOCUMENTS

| | | | |
|---|---|---|---|
| 10,826,888 B2* | 11/2020 | Song | ................... H04L 63/0823 |
| 10,841,213 B2* | 11/2020 | Chen | ....................... H04L 45/44 |

(Continued)

FOREIGN PATENT DOCUMENTS

| | | |
|---|---|---|
| CN | 107301536 A | 10/2017 |
| CN | 111260474 A | 6/2020 |

(Continued)

OTHER PUBLICATIONS

The World Intellectual Property Organization (WIPO) International Search Report for PCT/CN2022/122007 Nov. 28, 2022 7 Pages (including translation).

*Primary Examiner* — Ghodrat Jamshidi
(74) *Attorney, Agent, or Firm* — Anova Law Group, PLLC

(57) ABSTRACT

A method includes generating a pre-circulation block for a transaction on a first service branch chain in response to detecting a transaction circulation event for transferring the transaction from the first service branch chain to a second service branch chain, and transmitting, based on an ID of the pre-circulation block, a pre-circulation request to a service consensus node including the second service branch chain. The pre-circulation request is for requesting the service consensus node to generate a pre-reception result of the transaction on the second service branch chain. The method further includes generating a circulated block corresponding to the transaction on the first service branch chain, and transmitting, based on an ID of the circulated block, a circulation notification to the service consensus node. The circulation notification is used for informing the service (Continued)

consensus node to generate an operable block for the transaction on the second service branch chain.

17 Claims, 15 Drawing Sheets

(51) Int. Cl.
  *H04L 9/00* (2022.01)
  *H04L 9/32* (2006.01)

(56) References Cited

U.S. PATENT DOCUMENTS

| | | | |
|---|---|---|---|
| 11,888,991 B2* | 1/2024 | Chan | G06Q 20/401 |
| 2018/0260909 A1* | 9/2018 | Li | G06Q 20/38215 |
| 2019/0236726 A1* | 8/2019 | Unagami | G06Q 20/065 |
| 2019/0260574 A1* | 8/2019 | Shi | H04L 9/321 |
| 2019/0347657 A1* | 11/2019 | Guo | G06Q 20/389 |
| 2020/0210451 A1 | 7/2020 | Wang | |
| 2020/0336298 A1* | 10/2020 | Li | G06F 16/22 |
| 2021/0399904 A1* | 12/2021 | Fan | H04L 9/3265 |
| 2022/0269670 A1* | 8/2022 | Li | G06F 16/2343 |
| 2023/0214824 A1 | 7/2023 | Guo et al. | |

FOREIGN PATENT DOCUMENTS

| | | |
|---|---|---|
| CN | 112308713 A | 2/2021 |
| CN | 112948153 A | 6/2021 |
| CN | 113269545 A | 8/2021 |
| WO | 2019141984 A1 | 7/2019 |

* cited by examiner

CROSS-BLOCKCHAIN TRANSACTION PROCESSING METHOD AND APPARATUS, COMPUTER DEVICE, COMPUTER STORAGE MEDIUM, AND COMPUTER PROGRAM PRODUCT

CROSS-REFERENCE TO RELATED APPLICATIONS

This application is a continuation of International Application No. PCT/CN2022/122007, filed on Sep. 28, 2022, which is filed based upon and claims priority to Chinese Patent Application No. 202111349928.7, filed on Nov. 15, 2021, which are hereby incorporated by reference in their entirety.

FIELD OF THE TECHNOLOGY

This application relates to the field of blockchains in the field of computer technologies, and in particular, to a cross-blockchain transaction processing method and apparatus, a computer device, a computer storage medium, and a computer program product.

BACKGROUND OF THE DISCLOSURE

With rapid development of blockchain technology, more and more users or enterprises choose to store data to blockchain networks to prevent data tampering. At present, a blockchain network stores data corresponding to different service types using blockchains. For example, a blockchain network may store data corresponding to different service types using service branch chains corresponding to the different service types. In some cross-service processing scenarios, data needs cross-chain circulation between different service branch chains.

SUMMARY

In accordance with the disclosure, there is provided a cross-blockchain transaction processing method applied to a computer device and including generating a pre-circulation block for a transaction on a first service branch chain in response to detecting a transaction circulation event used for transferring the transaction from the first service branch chain to a second service branch chain, and transmitting, based on an identifier (ID) of the pre-circulation block, a pre-circulation request to a service consensus node including the second service branch chain. The pre-circulation request is used for requesting the service consensus node including the second service branch chain to generate a pre-reception result of the transaction on the second service branch chain. The method further includes generating a circulated block corresponding to the transaction on the first service branch chain, and transmitting, based on an ID of the circulated block, a circulation notification to the service consensus node including the second service branch chain. The circulation notification is used for informing the service consensus node including the second service branch chain to generate an operable block for the transaction on the second service branch chain.

Also in accordance with the disclosure, there is provided a computer device including a processor and a computer-readable storage medium storing a computer program. When executed by the processor, the computer program causes the process to generate a pre-circulation block for a transaction on a first service branch chain in response to detecting a transaction circulation event, the transaction circulation event being used for transferring the transaction from the first service branch chain to a second service branch chain, and transmit, based on an identifier (ID) of the pre-circulation block, a pre-circulation request to a service consensus node including the second service branch chain. The pre-circulation request is used for requesting the service consensus node including the second service branch chain to generate a pre-reception result of the transaction on the second service branch chain. The computer program further causes the processor to generate a circulated block corresponding to the transaction on the first service branch chain, and transmit, based on an ID of the circulated block, a circulation notification to the service consensus node including the second service branch chain. The circulation notification is used for informing the service consensus node including the second service branch chain to generate an operable block for the transaction on the second service branch chain.

In accordance with the disclosure, there is provided a cross-blockchain transaction processing method applied to a computer device and including receiving a pre-circulation request transmitted by a source consensus node including a first service branch chain. The pre-circulation request is used for requesting for generation of a pre-reception result of a transaction on a second service branch chain. The method further includes generating the pre-reception result for the transaction in response to the transaction being successfully validated in response to the pre-circulation request, returning, to the source consensus node, a feedback message generated based on the pre-reception result, such that the source consensus node generates, based on the feedback message, a circulated block corresponding to the transaction on the first service branch chain, and generating an operable block for the transaction on the second service branch chain in response to a circulation notification returned by the source consensus node based on the circulated block. The circulation notification is used for notifying to generate the operable block for the transaction on the second service branch chain.

BRIEF DESCRIPTION OF THE DRAWINGS

To describe the technical solutions in the embodiments of this application more clearly, the following describes the accompanying drawings required to be used for describing the embodiments. It is clear that the accompanying drawings in the following descriptions show merely some embodiments of this application, and a person of ordinary skill in the art may still derive other drawings from the accompanying drawings without creative efforts.

DESCRIPTION OF EMBODIMENTS

The following clearly and completely describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

Figure 1A:
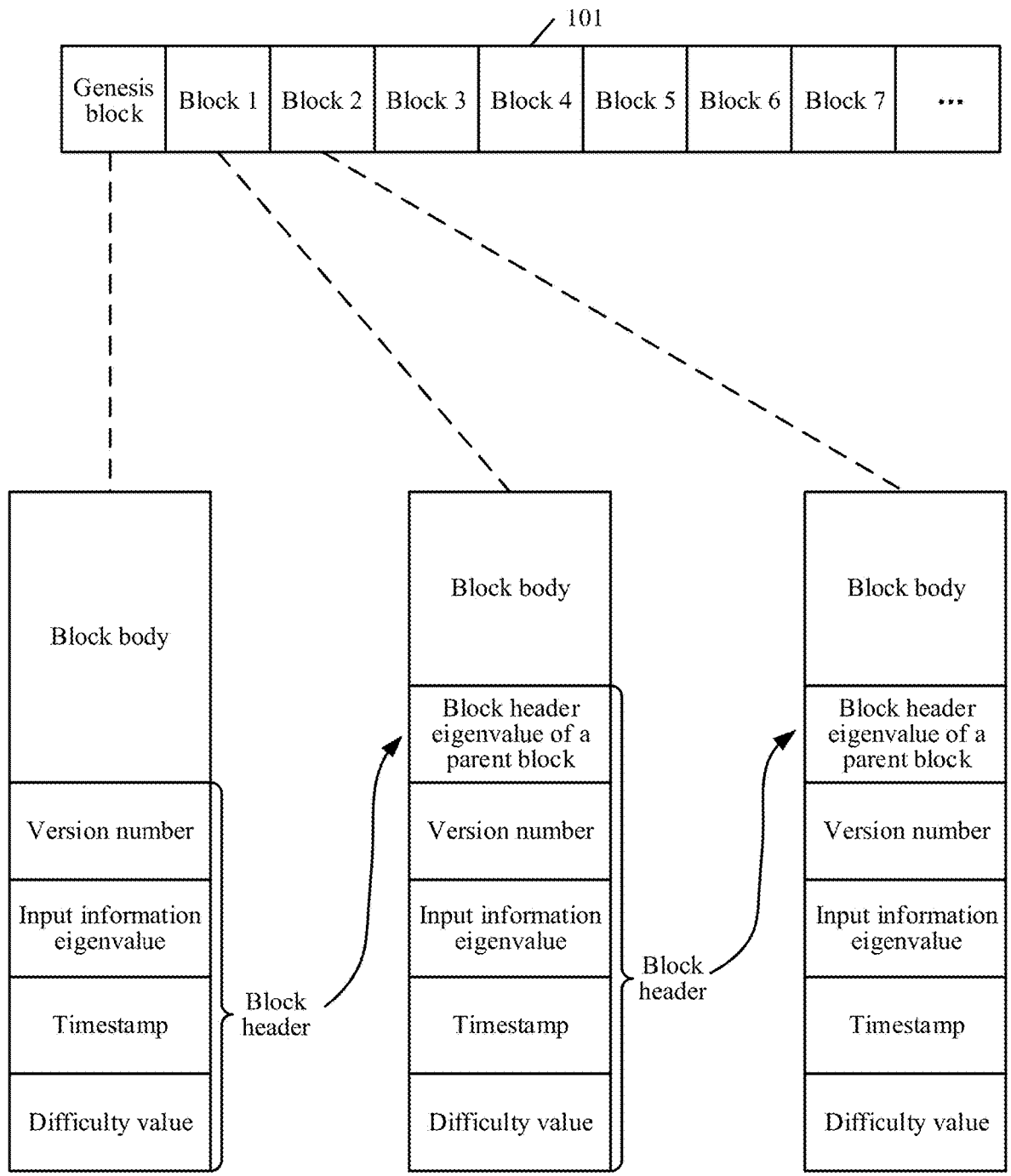
FIG. 1a is a schematic diagram of a structure of a blockchain according to an exemplary embodiment of this application.

The embodiments of this application involve a blockchain. The blockchain is a foundation of a blockchain technology. The blockchain is a novel application mode of a computer technology such as distributed data storage, peer to peer (P2P) transmission, a consensus mechanism, or an encryption algorithm. The blockchain is essentially a decentralized database, and is a string of data blocks associatively generated using a cryptographic method. Each data block includes information of a batch of network transactions, and is used for validate validity of the information (anti-counterfeiting) and generating a next block. FIG. 1*a* is a schematic diagram of a structure of the blockchain. As shown in FIG. 1*a*, the blockchain 101 includes a plurality of blocks. The first block of the blockchain is referred to as a genesis block. The genesis block includes a block header and a block body. The block header stores an input information eigenvalue, a version number, a timestamp, and a difficulty value. The block body stores input information. The genesis block is a parent block of a next block of the genesis block. The next block also includes a block header and a block body. The block header stores an input information eigenvalue of the current block, a block header eigenvalue of the parent block, a version number, a timestamp, and a difficulty value. By analogy, block data stored in each block of the blockchain is associated with that stored in a parent block. This ensures security of input information in the block.

Figure 1B:
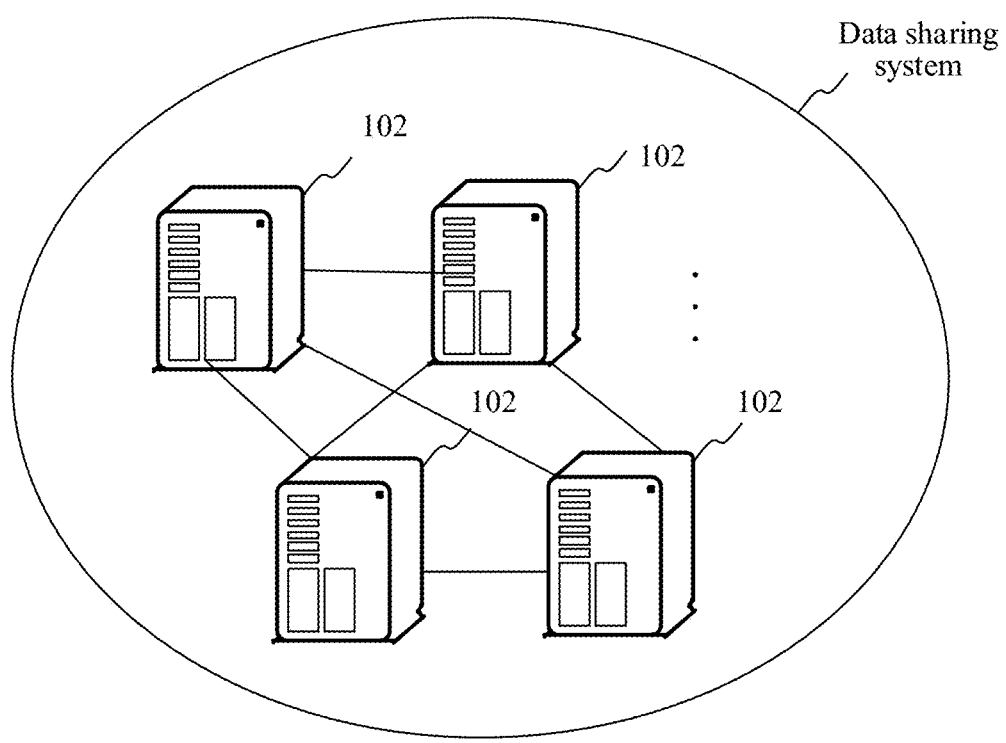
FIG. 1B is a schematic diagram of a structure of a blockchain network according to an exemplary embodiment of this application.

The blockchain may be maintained by a blockchain node in a blockchain network. The blockchain network may be understood as a data sharing system, which is a system configured to share data between blockchain nodes. FIG. 1*b* shows an exemplary structure of the data sharing system. As shown in FIG. 1*b*, the data sharing system may include a plurality of blockchain nodes 102. Each blockchain node 102 may be a server connected to the blockchain network, or a user terminal (for example, a client) connected to the blockchain network. A form of the blockchain node 102 is not limited herein. Each blockchain node 102 in the blockchain network has a corresponding node ID. In addition, each blockchain node 102 in the blockchain network may store a node ID of another blockchain node 102 in the blockchain network, so as to subsequently broadcast a generated block to the another blockchain node 102 in the data sharing system based on the node ID of the another blockchain node 102. A node ID list may be maintained in each blockchain node 102. A node name and a node ID are correspondingly stored in the node ID list. For the node ID list, refer to Table 1.

TABLE 1

| Node ID list | |
| --- | --- |
| Node name | Node ID |
| Node 1 | 117.114.151.174 |
| Node 2 | 117.116.189.145 |
| ... | ... |
| Node X (X is a positive integer) | xx.xxx.xxx.xxx |

As shown in Table 1, the node ID may be an Internet protocol (IP) address and any other information that may be used for identifying the node. For example, the node ID may be a binary sequence code (for example, 110001110). Table 1 uses only the IP address as an example for description. When a to-be-validated block is generated in the blockchain network, a blockchain node (or referred to a consensus node) that runs a consensus mechanism in the blockchain network perform consensus on the to-be-validated block, and after the consensus succeeds, synchronizes the to-be-validated block to each blockchain in the blockchain network based on a node ID in the node ID list, thereby implementing distributed storage of data in the blockchain network.

In some embodiments, at least one blockchain may be maintained in the blockchain network. That is, a plurality of blockchains may be maintained in the blockchain network. Each blockchain may be configured to store service data corresponding to different service types. A tax scenario is used as an example. A service involved in the tax scenario may include a bill service, a credit service, an import and export service, an enterprise qualification service, a tax refund service, and the like. For ease of managing the service data corresponding to the different service types better, a blockchain may be created for each service type in the blockchain network to store corresponding service data. In this way, the service data corresponding to the different service types may be supervised and maintained. However, it is found in practice that when the plurality of blockchains are maintained in the blockchain network, there is often a cross-chain circulation requirement for circulating a transaction stored on one blockchain to another blockchain. The transaction herein may be understood as transaction data or service data. Cross-chain circulation of the transaction may be a process of transferring transaction information of the transaction (for example, an ID for identifying the transaction, description information of the transaction, or digest information generated based on the to-be-processed transaction) and an operation permission for an operation (for example, access, download, or circulation) on the transaction from one blockchain to another blockchain. For example, a cross-chain circulation requirement of a transaction is involved in the tax scenario. It is assumed that a first service branch chain corresponding to the credit service and a second service branch chain corresponding to the bill service are maintained in a blockchain network corresponding to the tax scenario. It is assumed that billing for a target user (for example, any user with a billing requirement) needs a credit certificate of the target user. In this case, the credit certificate of the target user is first issued on the first service branch chain. After the credit certificate of the target user is issued, the credit certificate (for example, a credential for proving a credit of the target user) of the target user is required to be circulated to the second service branch chain, to facilitate billing based on the credit certificate of the target user on the second service branch chain.

An embodiment of this application proposes a cross-blockchain transaction processing solution, to implement cross-chain circulation of a transaction between different service branch chains. According to the solution, in response to a transaction circulation event for transferring a to-be-processed transaction (for example, any transaction) from a first service branch chain to a second service branch chain, the to-be-processed transaction is first set in a pre-circulation state on the first service branch chain, to indicate that the to-be-processed transaction is prepared to be circulated to the second service branch chain. Then, a pre-circulation request is transmitted to the second service branch chain. The pre-circulation request is used for requesting the second service branch chain to pre-receive the to-be-processed transaction. Pre-reception may be preparatory reception. Requesting the second service branch chain to pre-receive a target service may be requesting the second service branch chain to complete preparatory work for reception of the target service. For example, cross-chain validation is performed on the to-be-processed transaction, and after successful validation, a pre-reception result is generated for the to-be-processed transaction on the second service branch chain. The pre-reception result herein may include a pre-received block generated for the to-be-processed transaction on the second service branch chain. When the first service branch chain determines, based on the pre-reception result returned by the second service branch chain, that the second service branch chain is ready to receive the to-be-processed transaction, the first service branch chain sets the to-be-processed transaction in a circulated state, to indicate that the to-be-processed transaction and an operation permission for an operation on the to-be-processed transaction are already circulated to the second service branch chain, and the second service branch chain sets the to-be-processed transaction in an operable state. Therefore, another service branch chain that intends to obtain the to-be-processed transaction through circulation may obtain the to-be-processed transaction through circulation from only the second service branch chain but not the first service branch chain. Through the foregoing circulation steps performed for the to-be-processed transaction, the to-be-processed transaction and the operation permission for the operation on the to-be-processed transaction may be circulated (or transferred) from the first service branch chain to the second service branch chain, thereby implementing cross-chain circulation of the to-be-processed transaction between different service branch chains. In addition, a status (for example, the pre-circulation state, a pre-reception state, and the circulated state) corresponding to the to-be-processed transaction is set in each circulation step to keep status change consistency of the to-be-processed transaction in a circulation process and ensure uniqueness and security of the operation on the to-be-processed transaction in the circulation process.

In this embodiment of this application, multi-level circulation of the to-be-processed transaction is supported. That is, the transaction circulation event may indicate simultaneous circulation of the to-be-processed transaction to at least two service branch chains. For example, the to-be-processed transaction is stored on a service branch chain 1. When the to-be-processed transaction is prepared to be simultaneously circulated to a service branch chain 2 and a service branch chain 3, after the to-be-processed transaction is set in the pre-circulation state on the service branch chain 1, the pre-circulation request is generated based on the to-be-processed transaction in the pre-circulation state, and is simultaneously transmitted to a service consensus node A including the service branch chain 2 and a service consensus node B including the service branch chain 3. In addition, the service consensus node A including the service branch chain 2 and the service consensus node B including the service branch chain 3 set the status of the to-be-processed transaction to be the pre-reception state on the corresponding service branch chains. Within a specific time period, if a source consensus node receives a feedback message 1 returned by the service consensus node B including the service branch chain 3 based on the pre-reception result, the feedback message 1 returned by the service consensus node B including the service branch chain 3 carrying the pre-reception result that includes status information of the to-be-processed transaction on the service branch chain 3 and pre-reception signature information corresponding to the to-be-processed transaction, and does not receive a feedback message 2 returned by the service consensus node A including the service branch chain 2 based on the pre-reception result, the source consensus node may generate, on the service branch chain 1, a block of the to-be-processed transaction whose circulation to the service branch chain 2 fails, but the source consensus node still performs a process of circulating the to-be-processed transaction to the service branch chain 2. Based on this, the to-be-processed transaction may be simultaneously circulated to the service branch chain 2 and the service branch chain 3, to indicate that both the service branch chain 2 and the service branch chain 3 have the operation permission for the to-be-processed transaction. Certainly, the target service may be successfully circulated to only the service branch chain 2 or the service branch chain 3. A quantity of circulation levels of the to-be-processed transaction (that is, a quantity of service branch chains by which the to-be-processed transaction is to be received) is not limited in this embodiment of this application. The above uses an example in which the quantity of circulation levels is 1 and 2 for description, and may not form a limitation on the cross-blockchain solution provided in this embodiment of this application. For ease of description, the following uses an example in which the to-be-processed transaction is circulated from the first service branch chain to at least one second service branch chain for description.

Figure 1C:
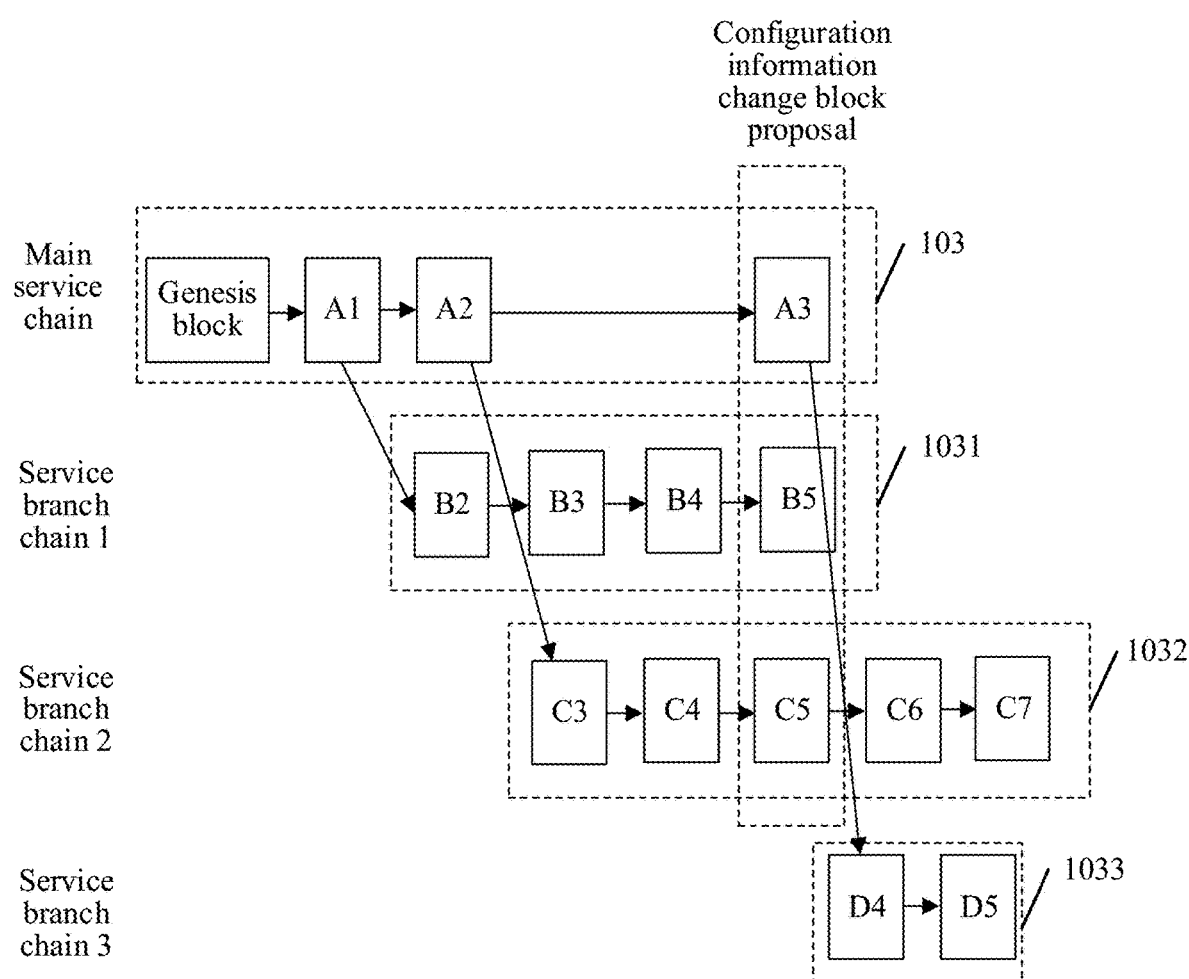
FIG. 1c is a schematic diagram of a structure of a tree-structured chain according to an exemplary embodiment of this application.

The cross-blockchain solution proposed in this embodiment of this application may be applied to a tree-structured chain. The tree-structured chain may be understood as a tree-like blockchain structure formed based on a main service chain (or referred to as a foundation subchain) and one or more service branch chains derived (or extended through forking) from the main service chain. FIG. 1c is a schematic diagram of an exemplary tree-structured chain. As shown in FIG. 1c, the tree-structured chain includes a main service chain 103 and service branch chains derived from the main service chain 103, for example, a service branch chain 1031, a service branch chain 1032, and a service branch chain 1033. The following separately describes the main service chain 103 and the service branch chains. (1) The main service chain 103 may include registration information of each service branch chain. The registration information of the service branch chain may include but is not limited to a chain ID of the branch chain, service description information, a node ID of a supervision node, and other information. The chain ID is a unique ID of the service branch chain. Based on the chain ID, the service branch chain may be quickly found from a blockchain network. The service description information is related information for describing a service corresponding to the service branch chain, for example, a type of the service, a data format of the service, or a validation manner for the service. The node ID of the supervision node may be a node ID of a consensus node that supervises (for example, has a consensus or storage permission) the service branch chain. Certainly, based on different actual application scenarios, in addition to the foregoing content, the registration information of the service branch chain may include other information. The registration information of the service branch chain is not limited in this embodiment of this application. (2) The service branch chain is derived from a specific block height of the main service chain. A genesis block of the service branch chain is on the main service chain. For example, in FIG. 1c, a genesis block of the service branch chain 1031 is a block A1 on the main service chain 103, a genesis block of the service branch chain 1032 is a block A2 on the main service chain 103, and a genesis block of the service branch chain 1033 is a block A3 on the main service chain 103. In the foregoing manner of extending service branch chains corresponding to different service types from the main service chain through forking, it may be effectively ensured that the main service chain is a trust root of all the service branch chains, and global information such as a service configuration of each service branch chain is collected, to facilitate subsequent supervision and review.

The following describes, by using an example in which the service branch chain 1031 is derived based on the main service chain, an implementation of deriving the service branch chain. When there is an event of creating (or deriving) the service branch chain 1031, a smart contract stored in the main service chain to register the service branch chain may be invoked to derive the service branch chain 1031. First, a corresponding chain identifier is generated for the service branch chain 1031 based on service configuration information (including service description information, a node ID of another consensus node that stores the branch chain, and the like) of the to-be-created service branch chain, and the chain ID corresponding to the service branch chain 1031 is registered and published on the main service chain. Then, the genesis block "block A1" of the service branch chain 1031 is generated based on the chain ID, the service description information, and the node ID of the supervision node. Finally, the genesis block "block A1" is stored to the main service chain. Therefore, derivation of the service branch chain 1031 is implemented. After the service branch chain 1031 is successfully derived, the service branch chain 1031 may run transaction uploading of the service branch chain 1031. For example, when there is subsequently an uploading request for service data of a service type corresponding to the service branch chain 1031, a block "block B2" generated based on the service data may be linked to the genesis block "block A1", thereby uploading transaction data (or referred to as service data) of the service type corresponding to the service branch chain 1031.

For the foregoing related content about derivation of the service branch chain based on the main service chain, there are the following points to be noted.

(1) If configuration information in the blockchain network changes, a node in the blockchain network uploads changed configuration information. In some embodiments, the node in the blockchain network uploads the changed configuration information to the main service chain and each service branch chain, and only after the changed configuration information is successfully uploaded to the main service chain and each service branch chain, the main service chain and each service branch chain respectively run respective uploading logics. For example, the main service chain executes a logic of deriving a service branch chain, and the service branch chain executes a logic of running data uploading. The configuration information in the blockchain network is different in different application scenarios. For example, in the tax scenario, the configuration information may include but is not limited to a change of a supervision rule and a calculation regulation in the field of taxation, a change of an important blockchain node, and alternation of a certificate authorizing node of a chain. Content of the configuration information in the blockchain network is not limited in this embodiment of this application.

Refer back to FIG. 1c. It is assumed that a latest block height of the current main service chain 103 is a block height corresponding to the "block A2", a latest block height corresponding to the service branch chain 1031 is a block height corresponding to a "block B4", and a latest block height of the service branch chain 1032 is a block height corresponding to a "block C4". In this case, in response to that the configuration information in the blockchain network changes, the logics (for example, the derivation logic for deriving a service branch chain on the main service chain or the uploading logic for data uploading on the service branch chain) run on the main service chain 103 and each service branch chain are suspended. Instead, a new block is first generated based on the changed configuration information, and the new block is synchronized to the main service chain, the service branch chain 1031, and the service branch chain 1032. For example, after the new block is synchronized to the main service chain 103, the latest block height of the main service chain 103 is updated to the "block A3", the latest block height of the service branch chain 1031 is updated to a block height corresponding to a "block B5", and the latest block height of the service branch chain 1032 is updated to a block height corresponding to a "block C5". After successful block proposal of the main service chain and all the service branch chains, the main service chain and each service branch chain continue to perform respective transaction uploading. For example, a new service branch chain 1033is created based on the main service chain. For another example, a "block C6" is added on the service branch chain 1032.

Figure 1D:
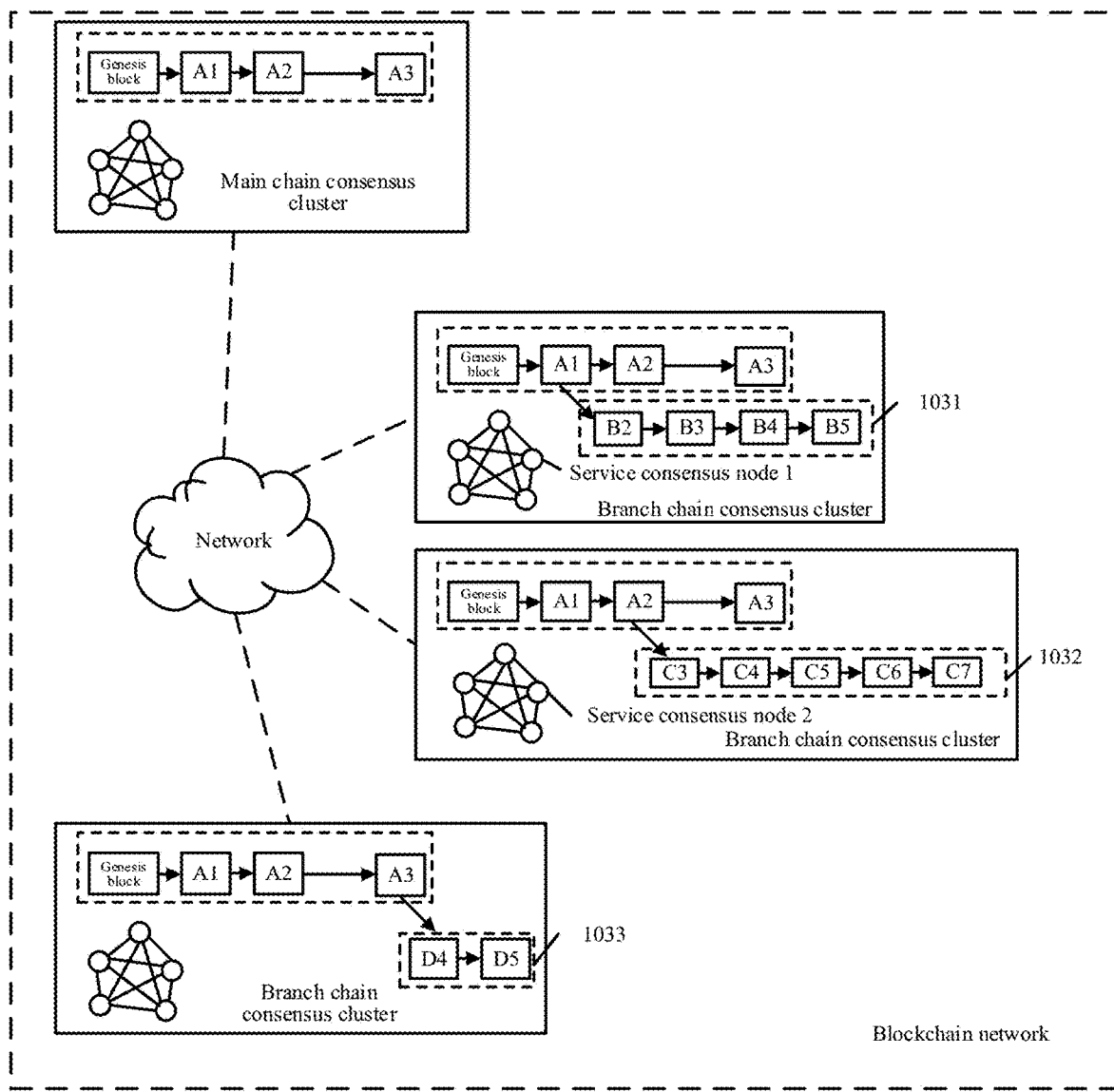
FIG. 1d is a schematic diagram of a structure of a blockchain network according to an exemplary embodiment of this application.

(2) The above describes the main service chain and the service branch chain in the blockchain network. The following describes, with reference to FIG. 1*d*, nodes that store the main service chain and the service branch chain in the blockchain network. As shown in FIG. 1*d*, the blockchain network may include a plurality of consensus clusters. Each consensus cluster may include one or more consensus nodes configured to maintain a chain in this cluster. To distinguish consensus clusters for maintaining the main service chain and the service branch chain, in this embodiment of this application, the consensus clusters in the blockchain network are generally divided into a main chain consensus cluster and a branch chain consensus cluster. One or more core consensus nodes in the main chain consensus cluster are configured to maintain the main service chain. Any core consensus node is a consensus node with a supervision permission for the main service chain. The supervision permission for the main service chain is a permission for an operation on the main service chain, or the like, for example, deriving the service branch chain from the main service chain. One or more service consensus nodes in the branch chain consensus cluster are configured to maintain the service branch chain in this cluster. Any service consensus node is a consensus node with a supervision permission for the service branch chain. For example, a service consensus node 1 has a supervision permission for the service branch chain 1031, and a service consensus node 2 has a supervision permission for the service branch chain 1032. The supervision permission for the service branch chain is a permission for consensus of a to-be-validated block that is to be stored to the service branch chain, or the like. The core consensus node may maintain all or some of the service branch chains. This is not limited in this embodiment of this application. In addition to maintaining the service branch chain in the corresponding cluster, the service consensus node synchronizes the main service chain, but does not have a supervision permission for the main service chain.

The following describes, by using an example with reference to the tax scenario, the nodes that store the main service chain and the service branch chain in the blockchain network. It is assumed that the tax scenario involves a billing service and a credit service, and the State Administration of Taxation has a supervision permission for all tax services. In this case, a device used by the State Administration of Taxation in the blockchain network may be connected to a main chain consensus cluster in the blockchain network. The main chain consensus cluster includes one or more core consensus nodes. For example, the device used by the State Administration of Taxation may serve as a core consensus node in the main chain consensus cluster. Similarly, a device used by a bill tax bureau with a supervision permission for the billing service may be connected to a bill consensus cluster, and a device used by a credit tax bureau with a supervision permission for the credit service may be connected to a credit consensus cluster. Both the bill consensus cluster and the credit consensus cluster are branch chain consensus clusters. With the foregoing tree-structured chain, services of a plurality of service types in the tax scenario may be stored and supervised on different chains. In this way, service data of different service types may be effectively distinguished to ensure uniformity of service data on each service branch chain, improve supervision efficiency of the service data, and facilitate maintenance of the service data.

(3) When a to-be-validated block is generated in any consensus cluster in the blockchain network, a consensus node in the any consensus cluster may perform consensus on the to-be-validated block. Therefore, different consensus clusters may concurrently perform consensus on to-be-validated blocks in the corresponding clusters, improving consensus efficiency. In addition, when any consensus cluster performs consensus on a to-be-validated block generated in this cluster, in addition to validating a service branch chain in the any consensus cluster, the main service chain may be found based on a genesis block of the service branch chain on the main service chain, and all blocks from a block height of the genesis block of the service branch chain to a block height of a genesis block of the main service chain are validated. This may implement stricter block validation, thereby ensuring security of service data stored on the chain. Certainly, in this embodiment of this application, consensus may be performed on only a new to-be-validated block if a historical uploaded block on the service branch chain is successfully validated.

Figure 1E:
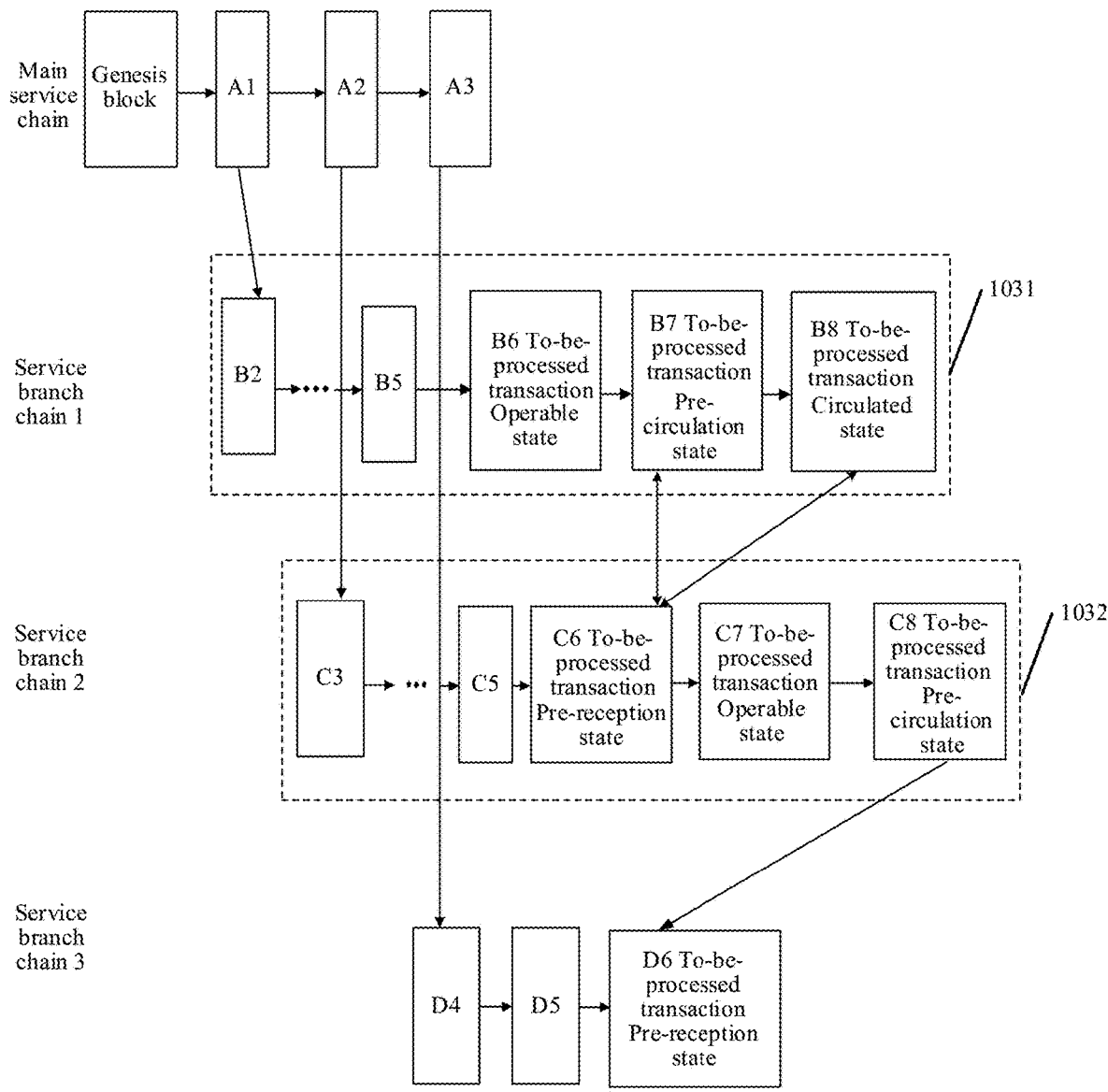
FIG. 1e is a schematic flowchart showing cross-chain circulation for circulating a to-be-processed transaction

Based on the foregoing tree-structured chain, the first service branch chain and the second service branch chain mentioned in this embodiment of this application may be two different service branch chains derived from the main service chain. In the tree-structured chain, for a cross-chain circulation process of circulating the to-be-processed transaction from the first service branch chain to the second service branch chain in this embodiment of this application, refer to FIG. 1*e*. As shown in FIG. 1*e*, it is assumed that the to-be-processed transaction is in the operable state on the service branch chain 1031 (that is, the first service branch chain), the operable state meaning that when the to-be-processed transaction is in the operable state, the to-be-processed transaction supports circulation to another service branch chain, and the transaction circulation event indicates circulation of the to-be-processed transaction from the service branch chain 1031 (that is, the first service branch chain) to the service branch chain 1032 (that is, the second service branch chain). In this case, the to-be-processed transaction is first modified from the operable state to the pre-circulation state on the service branch chain 1031 in response to the transaction circulation event. The pre-circulation state means that the to-be-processed transaction is ready to be circulated to the service branch chain 1032. A pre-circulation block B6 is generated.

A service consensus node (referred to as a "source consensus node" in this embodiment of this application) including the service branch chain 1031 transmits, based on the pre-circulation block, the pre-circulation request to a service consensus node including the service branch chain 1032. The service consensus node including the service branch chain 1032 generates a pre-received block for the to-be-processed transaction on the service branch chain 1032 in response to the pre-circulation request. In this case, the to-be-processed transaction is in the pre-reception state on the service branch chain 1032. The pre-reception state means that the service branch chain 1032 already receives the to-be-processed transaction, but does not have a permission to use the to-be-processed transaction. That is, when the to-be-processed transaction is in the pre-reception state on the service branch chain 1032, use of transaction information of the to-be-processed transaction is not allowed. The use includes access, processing, transfer, and the like. Then, the service consensus node including the service branch chain 1032 returns the pre-reception result to the source consensus node based on the pre-received block.

After the source consensus node successfully validates the pre-reception result, a circulated block is generated for the to-be-processed transaction on the service branch chain 1031. In this case, the to-be-processed transaction is in a received state on the service branch chain 1031, to indicate that the transaction information of the to-be-processed transaction and the operation permission for the operation on the to-be-processed transaction are already circulated to the service consensus node including the service branch chain 1032, and the service branch chain 1031 does not have a permission to circulate the to-be-processed transaction any more. Then, the source consensus node transmits, based on the circulated block, a circulation notification to the service consensus node including the service branch chain 1032, such that the service consensus node including the service branch chain 1032 generates an operable block for the to-be-processed transaction on the service branch chain 1032 based on the circulation notification, to indicate that the service branch chain 1032 already successfully received the to-be-processed transaction and the operation permission for the operation on the to-be-processed transaction.

The above describes, by using an example in which a blockchain structure is a tree-structured chain, a process of the cross-blockchain processing solution proposed in this embodiment of this application. It may be understood that when the blockchain structure is not a tree-structured chain, for example, the first service branch chain and the second service branch chain are two independent blockchains that are not linked to the main service chain, the cross-blockchain processing solution proposed in this embodiment of this application is not affected and limited.

Based on the foregoing cross-blockchain transaction processing solution, an embodiment of this application provides a cross-blockchain transaction processing method. The following describes the cross-blockchain transaction processing method proposed in this embodiment of this application with reference to the accompanying drawings.

Figure 2:
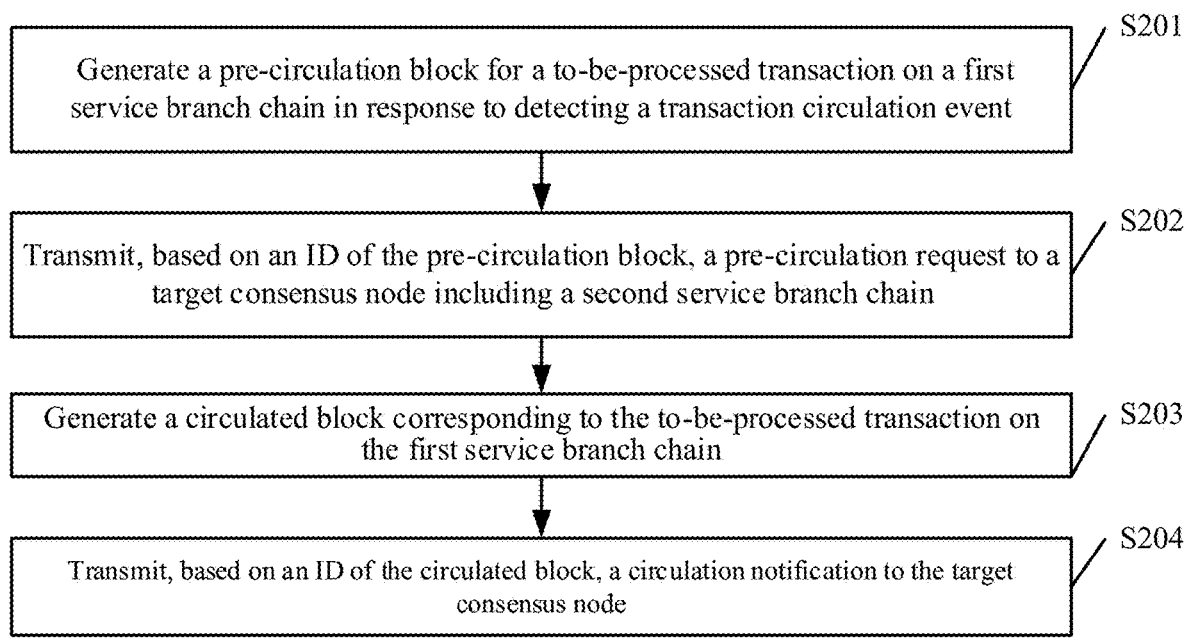
FIG. 2 is a schematic flowchart of a cross-blockchain transaction processing method according to an exemplary embodiment of this application.

FIG. 2 is a schematic flowchart of a cross-blockchain transaction processing method according to an embodiment of this application. The cross-blockchain transaction processing method may be performed by a computer device. The computer device may be a source consensus node with a supervision permission for a first service branch chain. The cross-blockchain transaction processing method may include but is not limited to steps S201 to S204. The following describes each step with reference to FIG. 2.

S201: Generate a pre-circulation block for a to-be-processed transaction on the first service branch chain in response to detecting a transaction circulation event.

The transaction circulation event is used for transferring the to-be-processed transaction from the first service branch chain to a second service branch chain. The transaction circulation event may carry a chain ID of the first service branch chain in which the to-be-processed transaction in an operable state is located, and a chain ID of the second service branch chain by which the to-be-processed transaction is to be received. The transaction circulation event is used for triggering circulation of the to-be-processed transaction (for example, transaction information of the to-be-processed transaction) and an operation permission for an operation (for example, circulation) on the to-be-processed transaction from the first service branch chain to the second service branch chain. A manner for determining that the transaction circulation event is detected may include determining, in response to detecting that a life cycle of the to-be-processed transaction in the operable state on the first service branch chain satisfies a transaction circulation condition, that the transaction circulation event is detected. Based on different content of the to-be-processed transaction, a definition and a length of the life cycle of the to-be-processed transaction and the transaction circulation condition corresponding to the to-be-processed transaction are different. For example, in a tax scenario, if the to-be-processed transaction is a billing transaction, the transaction circulation condition corresponding to the to-be-processed transaction is that the first service branch chain completes billing, and the length of the life cycle of the to-be-processed transaction on the first service branch chain may include a time length from reception of the to-be-processed transaction by the first service branch chain to completion of billing by the first service branch chain. Certainly, the transaction circulation condition and the life cycle corresponding to the to-be-processed transaction may alternatively be set manually based on a service requirement, which meets a customization requirement of service personnel for the to-be-processed transaction. The transaction circulation condition and the life cycle corresponding to the to-be-processed transaction are not limited in this embodiment of this application.

For example, the source consensus node first performs a pre-circulation process on the to-be-processed transaction on the first service branch chain in response to the transaction circulation event for transferring the to-be-processed transaction from the first service branch chain to the second service branch chain. The pre-circulation process includes setting a status of the to-be-processed transaction on the first service branch chain to be a pre-circulation state, that is, modifying the to-be-processed transaction from the operable state to the pre-circulation state on the first service branch chain. Setting or modifying the status of the to-be-processed transaction may include adding a status tag to the to-be-processed transaction to indicate a current status of the to-be-processed transaction. Then, the to-be-processed transaction in the pre-circulation state after the pre-circulation process is signed to generate pre-circulation signature information. The source consensus node may obtain a node private key of the source consensus node, and sign the to-be-processed transaction in the pre-circulation state using the node private key to obtain the pre-circulation signature information. Finally, a packaging process is performed on the to-be-processed transaction in the pre-circulation state and the pre-circulation signature information to obtain the pre-circulation block. The foregoing is merely an exemplary implementation of generating the pre-circulation block. In another implementation, a node certificate corresponding to the source consensus node may further be packaged into the pre-circulation block to prove a node identity of the source consensus node. The node certificate may be issued by an authority with a certificate issuing permission. The authority includes a public key infrastructure (PKI), and may bind a related key pair with an identity of a certificate holder to provide a related certificate management function for a user.

Figure 3:
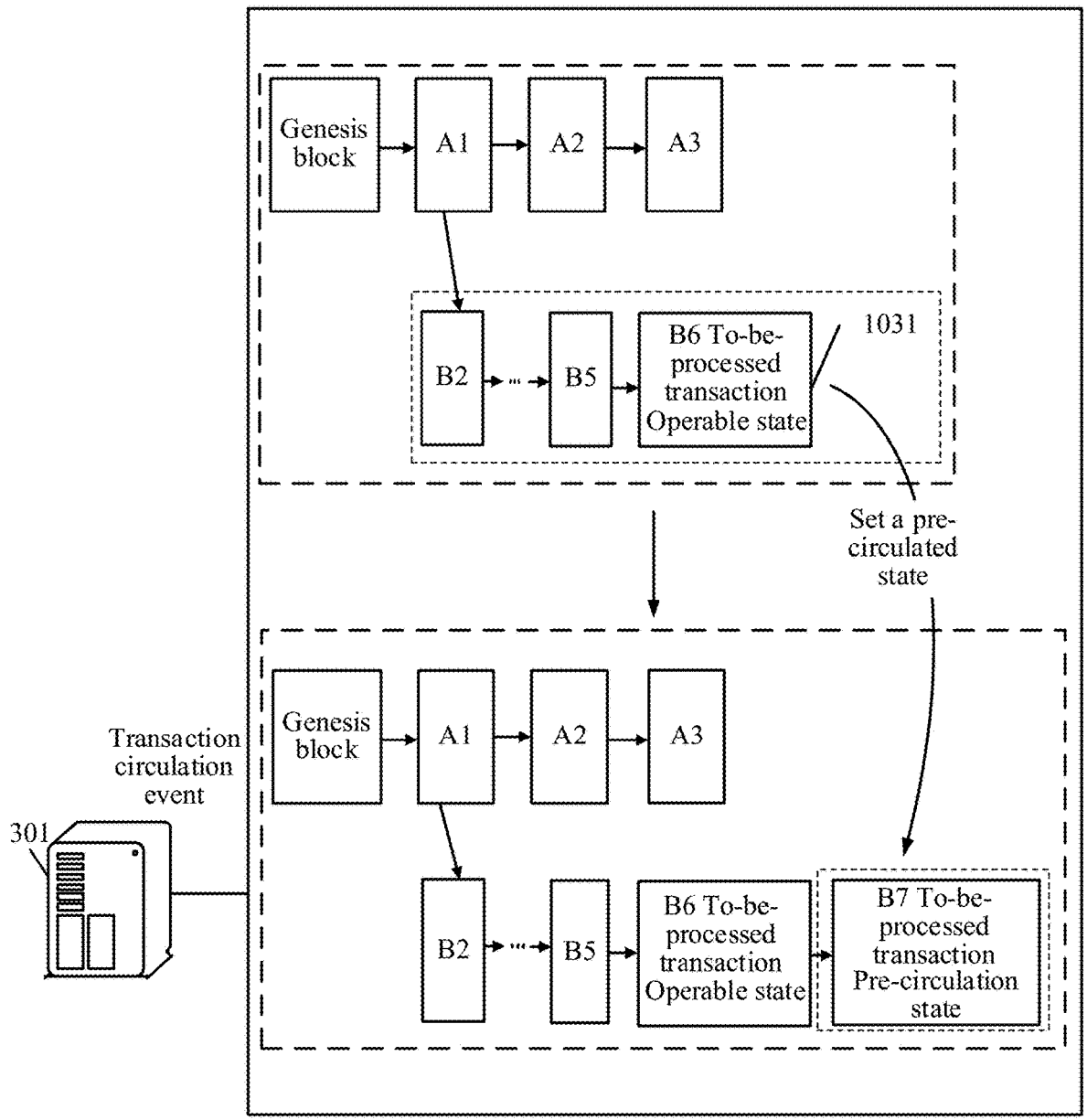
FIG. 3 is a schematic diagram showing generating a pre-circulation block for a to-be-processed transaction on a first service branch chain in response to a transaction circulation event according to an exemplary embodiment of this application.

FIG. 3 is an exemplary schematic flowchart of generating the pre-circulation block for the to-be-processed transaction on the first service branch chain in response to the transaction circulation event. As shown in FIG. 3, a source consensus node 301 adjusts the to-be-processed transaction from the operable state to the pre-circulation state on the first service branch chain 1031 in response to a transaction circulation event for transferring the to-be-processed transaction from the first service branch chain 1031 to the second service branch chain, and generates a pre-circulation block B7. After all or some of service consensus nodes in a branch chain consensus cluster that maintains the first service branch chain 1031 successfully perform consensus validation on the pre-circulation block B7, the pre-circulation block B7 is stored to the first service branch chain 1031. For example, the pre-circulation block B7 may be connected after an operable block B6.

All or some of the service consensus nodes in the branch chain consensus cluster that maintains the first service branch chain 1031 may invoke a consensus algorithm to implement consensus validation on the pre-circulation block. The following provides several exemplary consensus algorithms.

(1) Proof-of-work (PoW) is a measurement method set by a system (for example, the foregoing data sharing system) to achieve a specific objective. PoW may be understood as a proof for confirming work. The essence is that more work gives a better chance to earn an additional reward.

(2) Proof-of-stake (PoS) is an advanced consensus mechanism of PoW. For example, a node who holds an electronic resource for a longer time (a time length in which the electronic resource is held=a quantity of electronic resources that are held*time at which the electronic resource is held) has a better change to obtain a committing permission for the block. The electronic resource may be a resource that is stored in an electronic account in an electronic form and that may be circulated through the Internet. A mining difficulty is proportionally reduced based on a proportion and time of occupation of the electronic resource by each node, thereby increasing a speed of looking for a random number. PoS shortens time for reaching a consensus to some extent, but still requires mining.

(3) Delegated proof of stake (DPoS) is like board voting. A person holding an electronic resource votes a specific quantity of nodes for validation and committing as agents of the person. The system may generate a small quantity of electronic resources as rewards, to motivate more persons to get involved in election. According to DPoS, each person holding bitshares votes, thereby selecting 101 delegates. The 101 delegates may be understood as 101 super-nodes or mining pools. The 101 super-nodes have completely equal rights over one another. From a specific perspective, DPoS is like the parliament system or the system of people's congresses. If the selected delegates cannot execute their duties (no blocks are generated in their turn), these delegates may be removed, and the network may select new super-nodes to replace them. Therefore, DPoS may greatly reduce the quantity of nodes participating in validation and committing, and implement second-level consensus validation. However, the entire consensus mechanism is still dependent on electronic resources.

(4) Practical Bayzantine fault tolerance (PBFT) is a message-transmission-based consensus algorithm. The algorithm reaches a consensus through three phases. These phases may be repeated due to failures. For example, it is assumed that a total quantity of nodes is 3f+1, and f is a Bayzantine fault node. First, when the node discovers that a leader (for example, a delegate node, a committer, or a super node) is malicious, another node (replica) is elected as the leader by using the algorithm. Then, the leader broadcasts a value selected by the leader to another replica node using a pre-prepare message. The another replica node transmits a prepare message if accepting the value, or does not transmit a prepare message if not accepting the value. Next, once 2f nodes accept the prepare message, the node transmits a commit message. Finally, after 2f+1 nodes accept the commit message, it indicates that the value is determined. Through the foregoing process, the PBFT algorithm may reach a consensus that each node includes a participant or a supervisor of a service, and security and stability are ensured by the related party of the service. In addition, a consensus delay is about 2 to 5 seconds, and substantially meets a requirement for real-time processing for commercial use. Therefore, consensus efficiency is improved, and a high-frequency transaction requirement may be met.

(5) A distributed algorithm (Paxos) is a two-phase algorithm. There are mainly three types of roles: a proposer, an acceptor, and a learner. The proposer raises a proposal. The acceptor accepts or refuses the proposal. The learner obtains a final value after a consensus is reached. The Paxos algorithm includes two phases: a preparation phase and an approval phase. (1) The preparation phase: the proposer selects a proposal serial number n, and transmits a prepare request to most acceptors. After the acceptor receives the prepare request, if the proposal serial number is greater than those in all prepare requests that the acceptor already replied for, the acceptor returns a proposal accepted by the acceptor last time to the proposer, and commits not to reply for a proposal whose serial number is less than n. (2) The approval phase: when a proposer receives replies of most acceptors for a prepare request, the approval stage is entered. The proposer transmits an accept request to the acceptors that reply for the prepare request, including the serial number n and a value (if there is no accepted value, the proposer may independently determine the value). After receiving the accept request, the acceptor immediately accepts this request, without breaking a commitment made to another proposer.

(6) Replicated and fault tolerant (Raft) algorithm is a distributed consensus algorithm. The algorithm includes three roles: a follower, a candidate, and a leader. A node may be in one of the three states at a specific moment. The three roles may be mutually switched as time and a condition change. All nodes are initially followers. A follower that does not receive a heartbeat packet after a timeout becomes a candidate, and broadcasts a voting request. A node obtaining most votes becomes a leader. In this voting process, it is advantageous to a node that first transmits a voting request, and each node may vote only once. The leader periodically transmits the heartbeat packet to another node. A failure of the leader may trigger a new voting process.

One or more specific consensus algorithms to be used are not limited in this embodiment of this application.

In the foregoing implementation process, the source consensus node may adjust the to-be-processed transaction from the operable state to the pre-circulation state on the first service branch chain, to indicate that the to-be-processed transaction is ready to be circulated to the second service branch chain. The pre-circulation state of the to-be-processed transaction on the first service branch chain is locked.

The locked to-be-processed transaction may not be transferred to a third service branch chain. The third service branch chain is different from the second service branch chain. Consistency of the status of the to-be-processed transaction in a circulation process may be ensured only by locking the status (for example, the pre-circulation state) of the to-be-processed transaction before and after the to-be-processed transaction is circulated, thereby avoiding use of a third-party service center to control and manage the status of the to-be-processed transaction in the circulation process and improving transaction circulation efficiency.

S202: Transmit, based on an ID of the pre-circulation block, a pre-circulation request to a service consensus node including the second service branch chain. This service consensus node is also referred to as a "target consensus node."

In some embodiments, after the pre-circulation block is generated for the to-be-processed transaction on the first service branch chain, the pre-circulation request may be generated based on the pre-circulation block. The pre-circulation request may carry proof message of the pre-circulation block, the transaction information of the to-be-processed transaction, and the like. The pre-circulation request is used for requesting the service consensus node including the second service branch chain to generate a pre-reception result of the to-be-processed transaction on the second service branch chain. Then, the service consensus node including the second service branch chain may perform cross-chain validation on the pre-circulation block in response to the pre-circulation request, obtain the transaction information of the to-be-processed transaction after successful validation, generate a pre-received block for the to-be-processed transaction on the second service branch chain, and then generate a feedback message based on the pre-received block.

S203: Generate a circulated block corresponding to the to-be-processed transaction on the first service branch chain.

In some embodiments, during implementation of step S203, the feedback message that is returned by the service consensus node including the second service branch chain and that is generated based on the pre-reception result is first received. Then, the circulated block corresponding to the to-be-processed transaction is generated on the first service branch chain after the pre-reception result is successfully validated.

The feedback message returned by the service consensus node including the second service branch chain carries the pre-reception result. The pre-reception result includes status information of the to-be-processed transaction on the second service branch chain and pre-reception signature information corresponding to the to-be-processed transaction. The pre-reception signature information is generated by the service consensus node including the second service branch chain by signing the to-be-processed transaction with a node private key of the service consensus node including the second service branch chain. After the source consensus node receives the feedback message returned by the service consensus node including the second service branch chain based on the pre-reception result, the source consensus node may validate the pre-reception result by validating the status of the to-be-processed transaction on the second service branch chain based on the feedback message. After successful validation, the circulated block is generated for the to-be-processed transaction on the first service branch chain. It is to be noted that for an implementation herein of generating the circulated block for the to-be-processed transaction on the first service branch chain, refer to the foregoing related description about an implementation of generating the pre-circulation block for the to-be-processed transaction on the first service branch chain. A difference lies in that the status of the to-be-processed transaction is adjusted from the pre-circulation state to a circulated state herein.

An exemplary implementation process of validating the status of the to-be-processed transaction on the second service branch chain based on the feedback message may include the following operations. 1: A node public key of the service consensus node including the second service branch chain is obtained. For example, the node public node of the service consensus node is obtained from the service consensus node including the second service branch chain. Alternatively, the historically stored node public key of the service consensus node is obtained from a database of the source consensus node. 2: Signature verification is performed on the pre-reception signature information using the node public key of the service consensus node including the second service branch chain to obtain a signature verification result. A signature verification process may be summarized as: decrypting the pre-reception signature information using the node public key of the service consensus node including the second service branch chain to obtain digest information of the to-be-processed transaction, then generating digest information of the to-be-processed transaction using a same digest generation algorithm (for example, a message direst (MD), a secure hash algorithm (SHA), or a message authentication code (MAC)) as the service consensus node including the second service branch chain, determining whether the digest information of the to-be-processed transaction obtained through decryption is the same as the generated digest information of the to-be-processed transaction, and if the digest information of the to-be-processed transaction obtained through decryption is the same as the generated digest information of the to-be-processed transaction, determining that the verification result is that verification succeeds, or if the digest information of the to-be-processed transaction obtained through decryption is different from the generated digest information of the to-be-processed transaction, determining that the verification result is that verification fails. 3: A pre-reception validation result is generated based on the status information and the signature verification result. The pre-reception validation result indicates that the pre-reception result is successfully validated in a case that the status information indicates that the to-be-processed transaction is in a pre-reception state on the second service branch chain and the signature verification result indicates that signature verification of the pre-reception signature information succeeds. In a case that the status information indicates that the to-be-processed transaction is not in a pre-reception state on the second service branch chain or the signature verification result indicates that signature verification of the pre-reception signature information fails, it is determined that the pre-reception validation result indicates that the pre-reception result fails to be validated.

It is to be noted that in this embodiment of this application, a timeout rollback mechanism is further introduced to a circulation status changing process of the to-be-processed transaction. Therefore, the cross-chain circulation process of the transaction is high in fault tolerance and robustness, and transaction circulation in a complex or heterogeneous blockchain network scenario is facilitated. The timeout rollback mechanism is a mechanism in which the source consensus node enables timeout waiting after transmitting the pre-circulation request, and performs a subsequent operation based on whether receiving, within timeout waiting duration, the feedback message returned by the service consensus node including the second service branch chain.

The following describes a process in which the source consensus node receives the feedback message returned by the service consensus node including the second service branch chain based on the pre-reception result after the timeout rollback mechanism is introduced. In some embodiments, whether the feedback message returned by the service consensus node including the second service branch chain based on the pre-reception result is received is detected within first timeout waiting duration after transmission of the pre-circulation request. If the feedback message is received within the first timeout waiting duration, the status of the to-be-processed transaction on the second service branch chain is validated based on the feedback message to obtain the pre-reception validation result. Similarly, if it is detected that the to-be-processed transaction satisfies a status rollback condition, the status rollback condition including that the feedback message is not received within the first timeout waiting duration after transmission of the pre-circulation request, a status rollback process is performed on the to-be-processed transaction on the first service branch chain in response to detecting the status rollback condition of the to-be-processed transaction. The status rollback process includes setting the status of the to-be-processed transaction on the first service branch chain to be the operable state. In other words, when the feedback message is not received within the first timeout waiting duration, the status rollback process is performed on the to-be-processed transaction on the first service branch chain. The operable block is generated based on the to-be-processed transaction in the operable state after the status rollback process. The operable block is stored to the first service branch chain, to indicate that current cross-chain circulation for transferring the to-be-processed transaction from the first service branch chain to the second service branch chain fails.

There are many reasons why the service consensus node including the second service branch chain does not return the feedback message to the source consensus node within the first timeout waiting duration. For example, a communication connection between the service consensus node including the second service branch chain and the source consensus node is interrupted. For another example, the service consensus node including the second service branch chain fails to set the pre-reception state of the to-be-processed transaction for its own reason (for example, a device failure). This is not limited in this embodiment of this application. In addition, the status rollback condition may further include that the feedback message is received within the first timeout waiting duration, and the feedback message fails to be validated (for example, the validation result indicates that the status of the to-be-processed transaction on the second service branch chain is not the pre-reception state). In this implementation, the source consensus node also perform a status rollback process on the to-be-processed transaction on the first service branch chain.

Figure 4:
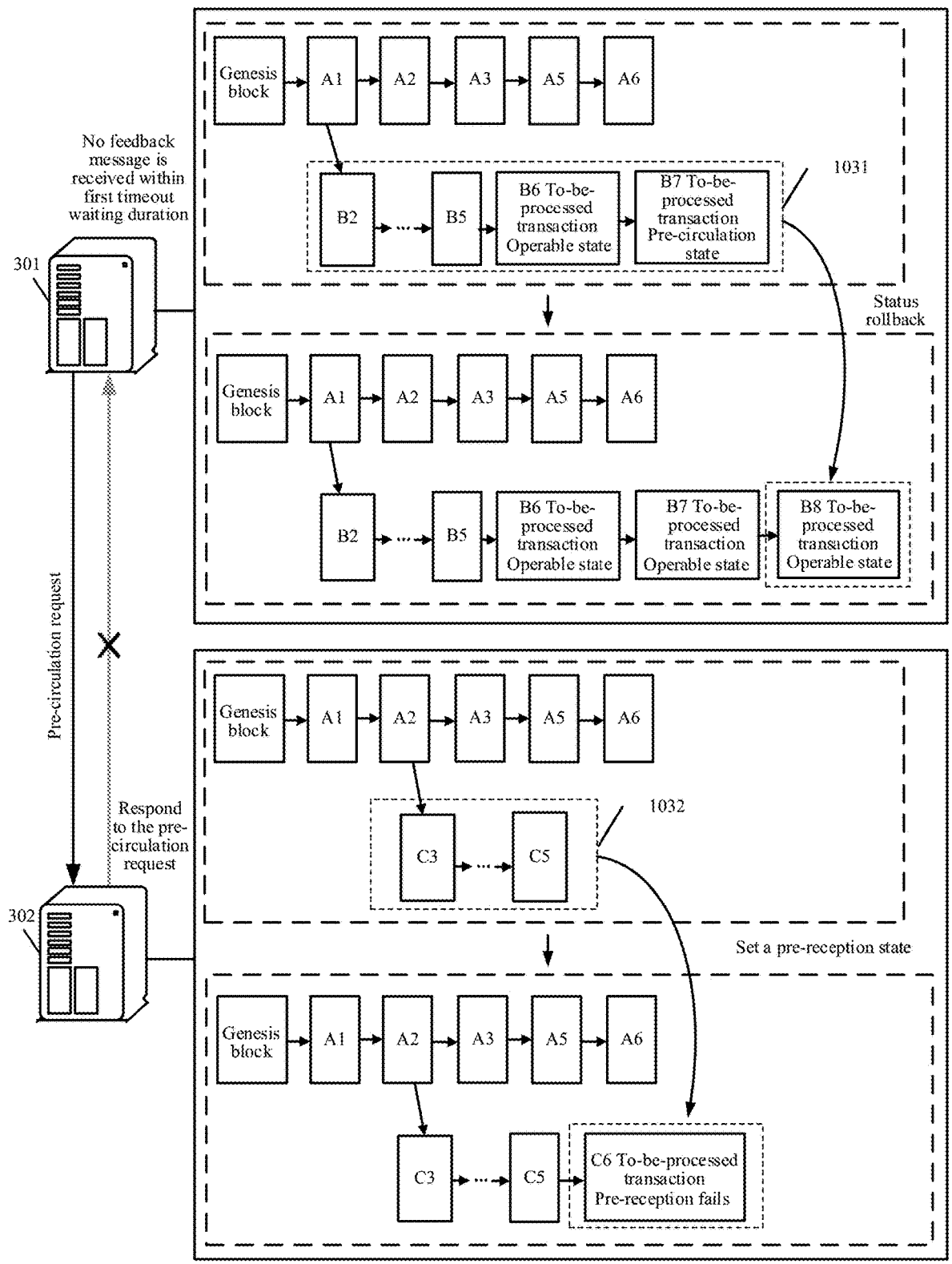
FIG. 4 is a schematic diagram showing status rollback of a to-be-processed transaction on a first service branch chain according to an exemplary embodiment of this application.

For example, if the first timeout waiting duration set by the source consensus node is 2 hours, after the source consensus node transmits the pre-circulation request, timing is started. If reception of the feedback message returned by the service consensus node including the second service branch chain based on the pre-reception result is detected when timing duration reaches 1.5 hours, it indicates that the service consensus node including the second service branch chain returns the feedback message within the first timeout waiting duration. In this case, a step of responding to a continuous circulation condition is triggered. If reception of the feedback message returned by the service consensus node including the second service branch chain based on the pre-reception result is not detected when timing duration reaches 2 hours, it indicates that the service consensus node including the second service branch chain does not return the feedback message within the first timeout waiting duration. In this case, it is determined that the status rollback condition of the to-be-processed transaction is detected, and a step of responding to the status rollback condition is triggered. FIG. 4 is an exemplary process of status rollback of the to-be-processed transaction on the first service branch chain. As shown in FIG. 4, after the source consensus node 301 transmits the pre-circulation request to a service consensus node 302 including the second service branch chain, if not receiving, within the first timeout waiting duration, the feedback message returned by the service consensus node 302 including the second service branch chain, the source consensus node 301 sets the status of the to-be-processed transaction to be the operable state, and generate an operable block B8 for the to-be-processed transaction on the first service branch chain 1031, to indicate that the status of the to-be-processed transaction on the first service branch chain 1031 is rolled back to the operable state.

S204: Transmit, based on an ID of the circulated block, a circulation notification to the service consensus node including the second service branch chain.

The circulation notification is used for informing the service consensus node including the second service branch chain to generate the operable block for the to-be-processed transaction on the second service branch chain. After receiving the circulation notification transmitted by the source consensus node, the service consensus node including the second service branch chain performs cross-chain validation on the to-be-processed transaction on the first service branch chain based on the circulation notification, and generates the operable block for the to-be-processed transaction on the second service branch chain after successful validation. In this way, the to-be-processed transaction is transferred from the first service branch chain to the second service branch chain. If another service branch chain subsequently intends to obtain the to-be-processed transaction through circulation, the another service branch chain is required to request the second service branch chain to circulate the to-be-processed transaction.

In this embodiment of this application, the to-be-processed transaction and the operation permission for the operation on the to-be-processed transaction may be circulated (or transferred) from the first service branch chain to the second service branch chain, thereby implementing cross-chain circulation of the to-be-processed transaction between different service branch chains. In addition, the status (for example, the pre-circulation state, the pre-reception state, and the circulated state) corresponding to the to-be-processed transaction is set in each circulation step to keep status change consistency of the to-be-processed transaction in the circulation process and ensure uniqueness and security of the operation on the to-be-processed transaction in the circulation process.

Figure 5:
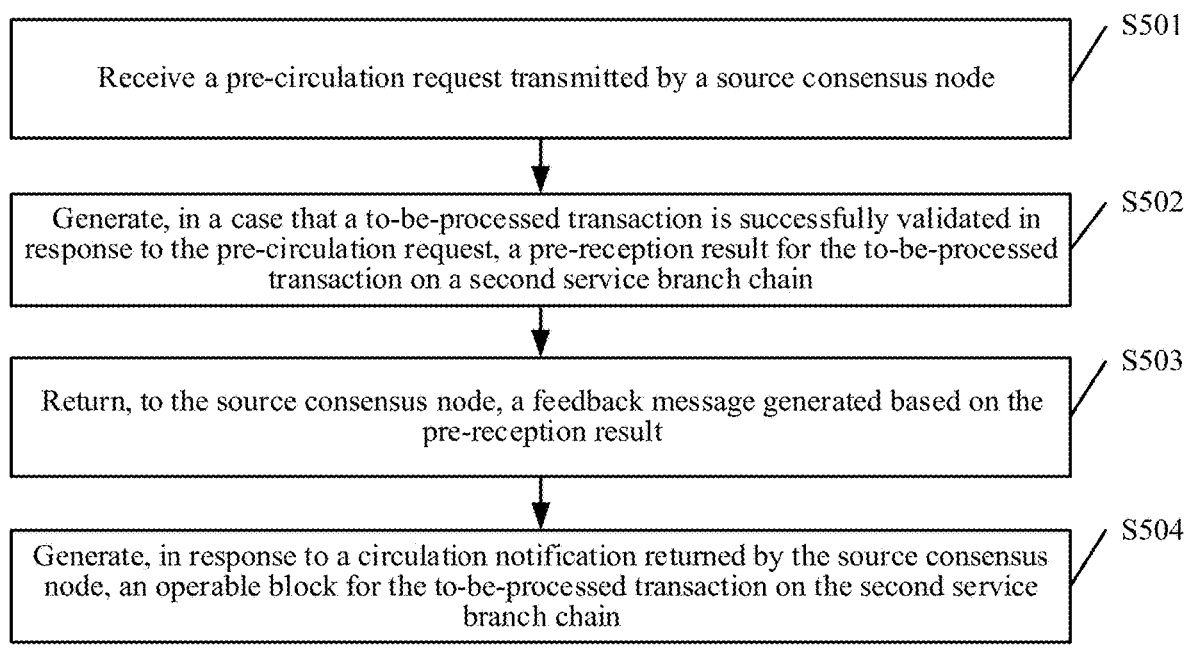
FIG. 5 is a schematic flowchart of a cross-blockchain transaction processing method according to an exemplary embodiment of this application.

FIG. 5 is a schematic flowchart of a cross-blockchain transaction processing method according to an exemplary embodiment of this application. The cross-blockchain transaction processing method may be performed by a computer device. The computer device may be a service consensus node that has a supervision permission for a second service branch chain and that includes the second service branch chain. The cross-blockchain transaction processing method may include but is not limited to steps S501 to S504. The following describes each step.

S501: Receive a pre-circulation request transmitted by a source consensus node.

S502: Generate a pre-reception result for a to-be-processed transaction on the second service branch chain in a case that the to-be-processed transaction is successfully validated in response to the pre-circulation request.

In steps S501 to S502, the pre-circulation request transmitted by the source consensus node carries transaction information of the to-be-processed transaction. The pre-circulation request is used for requesting for generation of the pre-reception result of the to-be-processed transaction on the second service branch chain. After receiving the pre-circulation request, the service consensus node including the second service branch chain may perform cross-chain validation on the to-be-processed transaction in response to the pre-circulation request, and generate the pre-reception result for the to-be-processed transaction on the second service branch chain after successful validation. The pre-reception result herein may include a pre-received block generated for the to-be-processed transaction on the second service branch chain, or a notification message generated based on a pre-received block. The notification message indicates a status of the to-be-processed transaction on the second service branch chain.

For an implementation process in which the service consensus node including the second service branch chain generates the pre-received block on the second service branch chain, refer to related description about an implementation process of generating the pre-circulation block or the circulated block in the embodiment shown in FIG. 2. Only the following is described herein: the status of the to-be-processed transaction is set to be a pre-reception state on the second service branch chain, to indicate that the service consensus node including the second service branch chain is ready to receive the to-be-processed transaction. That the service consensus node including the second service branch chain is ready to receive the to-be-processed transaction means that the service consensus node including the service branch chain already obtains the transaction information of the to-be-processed transaction, but the to-be-processed transaction is in an unavailable state on the second service branch chain. In other words, when the to-be-processed transaction is in the pre-reception state on the second service branch chain, use of the transaction information of the to-be-processed transaction is not allowed. The use includes access, processing (for example, editing and updating), transfer, and the like. Then, the to-be-processed transaction in the pre-reception state is signed using a note private key of the service consensus node including the second service branch chain to obtain pre-reception signature information. Finally, a packaging process is performed on the to-be-processed transaction in the pre-reception state and the pre-reception signature information to obtain the pre-received block. When the pre-reception result is not the pre-received block, the pre-reception result is further required to be generated based on the pre-received block.

Figure 6:
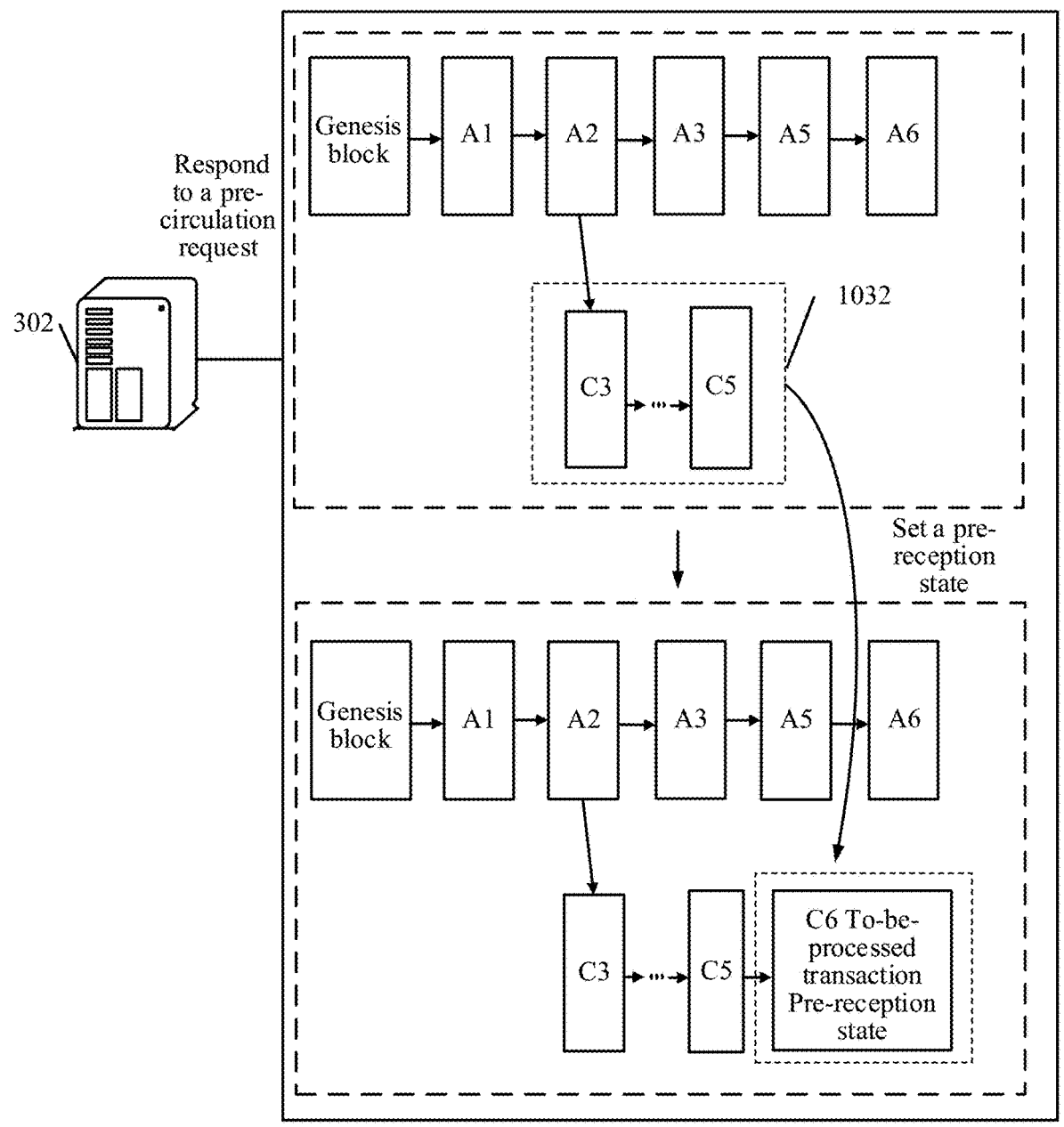
FIG. 6 is a schematic diagram showing generating a pre-received block for a to-be-processed transaction on a second service branch chain in response to a pre-reception result according to an exemplary embodiment of this application.

FIG. 6 is an exemplary schematic diagram showing generating the pre-received block for the to-be-processed transaction on the second service branch chain in response to the pre-reception result. As shown in FIG. 6, the service consensus node 302 including the second service branch chain first sets the to-be-processed transaction in the pre-reception state in response to the received pre-circulation request, and then generates a pre-received block C6 based on the to-be-processed transaction in the pre-reception state. After a consensus node with a consensus permission for the second service branch chain successfully performs consensus validation on the pre-received block C6, the pre-received block C6 is stored to the second service branch chain. For example, the pre-received block C6 is connected after a block C5.

The foregoing process in which the service consensus node including the second service branch chain performs cross-chain validation on the to-be-processed transaction in response to the pre-circulation request may include: validating the status of the to-be-processed transaction on a first service branch chain, and validating whether circulation of the to-be-processed transaction meets a circulation requirement of the service consensus node including the second service branch chain. Where:

(1) An implementation of validating the status of the to-be-processed transaction on the first service branch chain may include that: the pre-circulation request may carry status information of the to-be-processed transaction on the first service branch chain. When the status information indicates that the status of the to-be-processed transaction on the first service branch chain is a pre-circulation state, it indicates that the to-be-processed transaction is successfully switched from an operable state to the pre-circulation state on the first service branch chain. In this case, it is determined that the status of the to-be-processed on the first service branch chain is successfully validated. When the status information indicates that the status of the to-be-processed transaction on the first service branch chain is not a pre-circulation state, it indicates that status circulation of the to-be-processed transaction on the first service branch chain fails. In this case, it is determined that the status of the to-be-processed on the first service branch chain fails to be validated.

(2) Validation of whether circulation of the to-be-processed transaction meets the circulation requirement of the service consensus node including the second service branch chain may include: validating whether a receiving object of the to-be-processed transaction is the service consensus node including the second service branch chain. For example, signature verification may be performed on the to-be-processed transaction using a node public key of the source consensus node. If signature verification succeeds, it indicates that the service consensus node including the second service branch chain is the receiving object of the to-be-processed transaction. If signature verification fails, the service consensus node including the second service branch chain is not the receiving object of the to-be-processed transaction. Alternatively, validity validation is performed on the to-be-processed transaction. Validity validation means at least one of the following: validating whether a data format of the to-be-processed transaction meets a data format requirement of the service consensus node including the second service branch chain, validating whether the to-be-processed transaction is valid or moralistic data, and validating whether a transmitter of the to-be-processed transaction conforms to a rule. Certainly, the above provides only several exemplary validation manners for the to-be-processed transaction. It may be understood that the to-be-processed transaction may be validated through different processes based on different service requirements. A validation process of the to-be-processed transaction is not limited in this embodiment of this application.

S503: Return, to the source consensus node, a feedback message generated based on the pre-reception result.

After generating the pre-received block for the to-be-processed transaction on the second service branch chain based on step S502, the service consensus node including the second service branch chain may obtain the pre-reception result based on the pre-received block, and return the feedback message to the source consensus node based on the pre-reception result. The feedback message is used for feeding back the status of the to-be-processed transaction on the second service branch chain. Therefore, the source consensus node generates, in response to the feedback message after the pre-reception result is successfully validated, a circulated block corresponding to the to-be-processed transaction on the first service branch chain, and returns a circulation notification based on the circulated block. The circulation notification is used for notifying to generate an operable block for the to-be-processed transaction on the second service branch chain. It is to be noted that for the foregoing implementation in which the source consensus node responds to the feedback message, refer to the related description about the implementation shown in step S203 in the embodiment shown in FIG. 2.

S504: Generate the operable block for the to-be-processed transaction on the second service branch chain in response to the circulation notification returned by the source consensus node.

In some embodiments, after receiving the circulation notification, the service consensus node including the second service branch chain may validate the status of the to-be-processed transaction on the first service branch chain in response to the circulation notification, to validate whether the status of the to-be-processed transaction on the first service branch chain is a circulated state. After the status of the to-be-processed transaction on the first service branch chain is successfully validated, the to-be-processed transaction may be adjusted from the pre-reception state to the operable state. The to-be-processed transaction in the operable state supports circulation to another service branch chain. Then, the operable block is generated for the to-be-processed transaction on the second service branch chain based on the to-be-processed transaction in the operable state.

It is to be noted that like the source consensus node, the service consensus node including the second service branch chain in this embodiment of this application also supports a timeout rollback mechanism. The following describes a process in which the service consensus node including the second service branch chain receives the circulation notification returned by the source consensus node after the timeout rollback mechanism is introduced. Where: the service consensus node including the second service branch chain detects, within second timeout waiting duration after transmission of the feedback message, whether the circulation notification returned by the source consensus node is received. If the circulation notification is received within the second timeout waiting duration, a step of responding to the circulation notification returned by the source consensus node is triggered. If the circulation notification is not received within the second timeout waiting duration, the service consensus node including the second service branch chain may enter slow waiting, to periodically access the source consensus node to determine whether the circulation notification is generated for the pre-reception result. A process in which the service consensus node including the second service branch chain periodically accesses the source consensus node may include: obtaining an access cycle for accessing the source consensus node, the access cycle being preset by service personnel based on a service requirement; and transmitting an access request to the source consensus node based on the access cycle, the access request being used for requesting the source consensus node to return the circulation notification, until the circulation notification returned by the source consensus node is received. Certainly, if the service consensus node including the second service branch chain periodically accesses the source consensus node within preset duration, but still does not receive the circulation notification returned by the source consensus node, the service consensus node including the second service branch chain may end this cross-chain circulation process of transferring the to-be-processed transaction from the first service branch chain to the second service branch chain. That is, current cross-chain circulation of the to-be-processed transaction fails. A value of the preset duration is not limited in this embodiment of this application. For example, the preset duration may be total duration of three access cycles.

Figure 7:
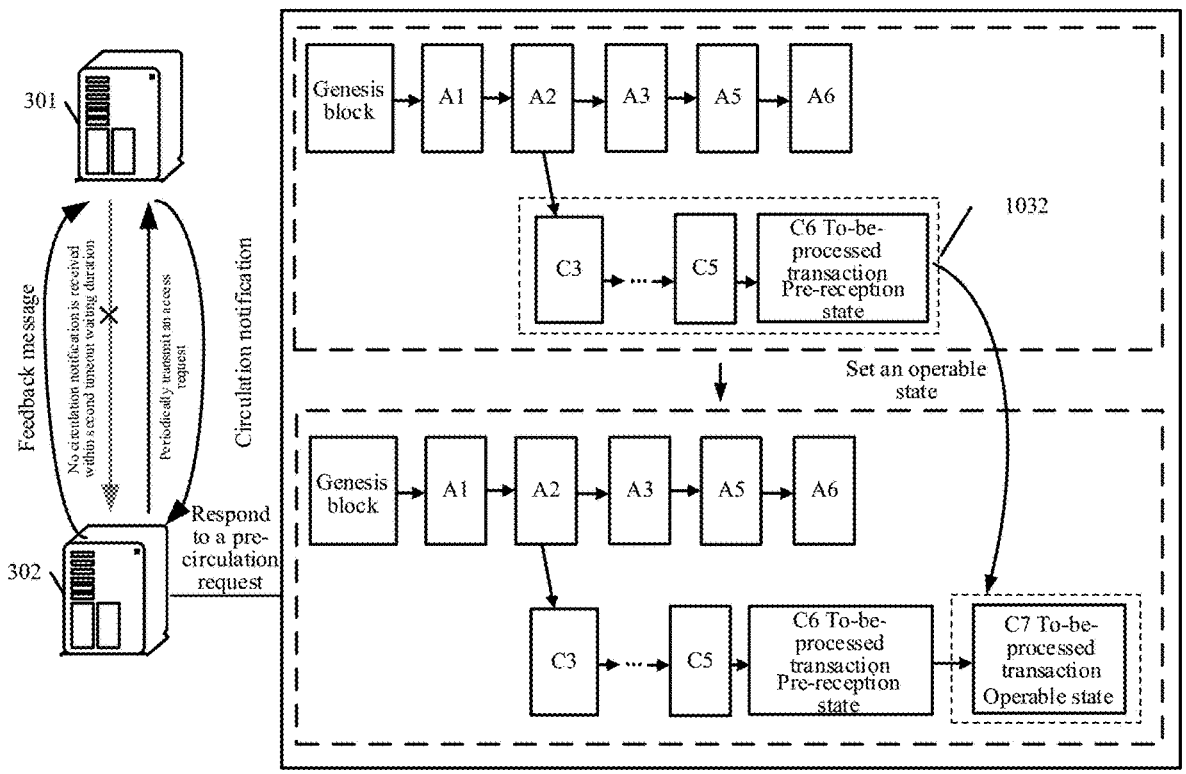
FIG. 7 is a schematic diagram showing periodically accessing a source consensus node by a service consensus node including a second service branch chain according to an exemplary embodiment of this application.

The following describes, with reference to FIG. 7, the process in which the service consensus node including the second service branch chain periodically accesses the source consensus node. A shown in FIG. 7, after the service consensus node 302 including the second service branch chain transmits the feedback message to the source consensus node 301, timing is started. If timing duration is equal to the second timeout waiting duration, and the service consensus node 302 including the second service branch chain still does not receive the circulation notification returned by the source consensus node 301, the service consensus node 302 including the second service branch chain transmits the access request to the source consensus node 301 at an interval of the access cycle, to request the source consensus node 301 to return the circulation notification. After receiving the circulation notification returned by the source consensus node, the service consensus node 302 including the second service branch chain validates the status of the to-be-processed transaction on the first service branch chain based on the circulation notification. When a validation result indicates that the to-be-processed transaction on the first service branch chain is the circulated state, an operable block C7 is generated for the to-be-processed transaction on the second service branch chain. After consensus validation of the operable block C7 succeeds, the operable block C7 is stored to the second service branch chain. Therefore, the to-be-processed transaction and an operation permission for an operation on the to-be-processed transaction are transferred from the first service branch chain to the second service branch chain.

In this embodiment of this application, the to-be-processed transaction and the operation permission for the operation on the to-be-processed transaction may be circulated between different service branch chains in response to a transaction circulation event for transferring the to-be-processed transaction from the first service branch chain to the second service branch chain, thereby implementing cross-chain circulation of the to-be-processed transaction. In addition, the status of the to-be-processed transaction on a service branch chain is locked in each circulation step in a circulation process of the to-be-processed transaction. For example, when the status of the to-be-processed transaction is set to be the pre-circulation state on the first service branch chain, the pre-circulation state of the to-be-processed transaction on the first service branch chain is locked, such that the to-be-processed transaction in the pre-circulation state cannot be circulated to another service branch chain (for example, a service branch chain different from the second service branch chain). This ensures status change consistency of the to-be-processed transaction. In addition, the cross-chain process of the to-be-processed transaction is not controlled dependently on a third-party service center, which reduces cross-chain transaction circulation costs. Moreover, in this embodiment of this application, the timeout rollback mechanism is further introduced to improve fault tolerance and robustness of the cross-chain transaction circulation process. Therefore, the cross-blockchain processing solution provided in this embodiment of this application may be applied to transaction circulation in a complex blockchain network, and extensibility of an application scenario corresponding to the solution is improved.

A blockchain network may include a single-layer, double-layer, or multilayer network. The "layer" herein means a quantity of subnetworks in the blockchain network. The subnetworks may be obtained through division in consideration of a service requirement, a communication connection, security, or another aspect. Security of mutual access of blockchain nodes in a same subnetwork is ensured by using a consensus mechanism, while additional identity management and/or network control are/is required by mutual access of blockchain nodes in different subnetworks. For example, the blockchain network shown in FIG. 1b is a single-layer blockchain network. Security access and data synchronization may be implemented between blockchain nodes in the single-layer blockchain network by using the consensus mechanism. In an implementation, the cross-blockchain processing method proposed in the embodiments of this application is applied to the single-layer blockchain network shown in FIG. 1b. In this implementation, the source consensus node and the service consensus node including the second service branch chain in the embodiments of this application are consensus nodes in the single-layer blockchain network.

In another implementation, in addition to the single-layer blockchain network (for example, including only one blockchain network) described in the foregoing embodiments, the cross-blockchain processing method proposed in the embodiments of this application may be applied to a complex double-layer or multilayer blockchain network. For example, a blockchain is applied to some scenarios, for example, a bill service scenario, or a data storage scenario of a government, a commercial organization, or the like. In these scenarios, not all nodes in the blockchain network have enough resources and necessities to become nodes participating in blockchain consensus. Considering data security, when a blockchain system involves related data of personal privacy or national security, a general P2P blockchain deployment manner is also inapplicable. An embodiment of this application provides a double-layer chain, to meet the service requirement (for example, separating an intranet/extranet, a service network, and an office network) and further improve data security and privacy. A "witness sub-network-consensus subnetwork" double-layer network architecture is formed using a P2P network. The P2P network is based on a specific type of network protocol, so that no center is required to maintain a network status between peer nodes, and each node maintains a node status of the entire network and a connection status between the node and an adjacent node through broadcast interaction with the adjacent node.

Figure 8:
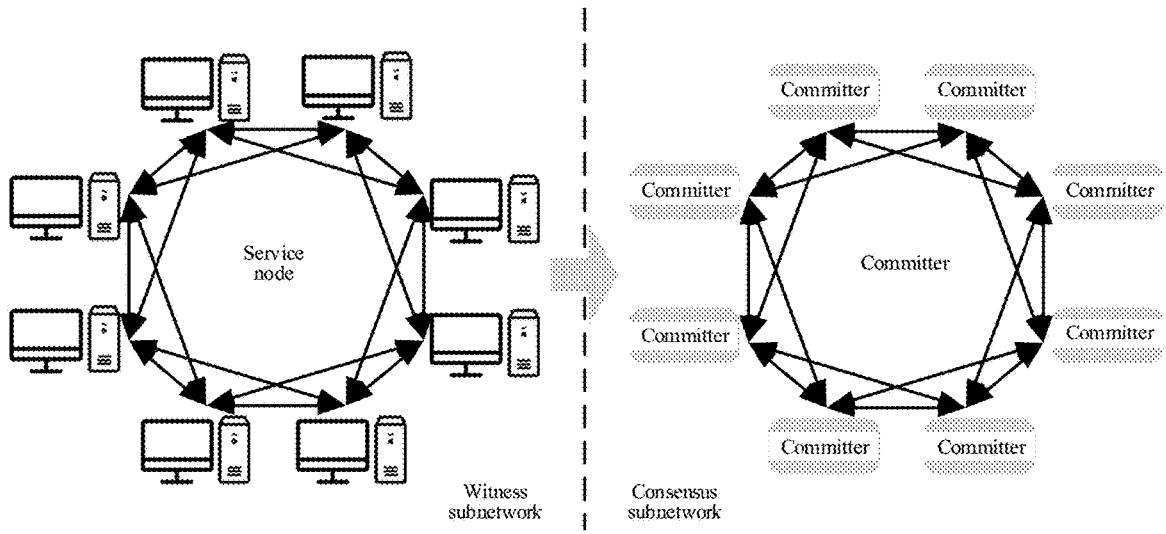
FIG. 8 is a schematic diagram of an architecture of a double-layer blockchain network according to an exemplary embodiment of this application.

FIG. 8 is a diagram of an architecture of the double-layer blockchain network according to an exemplary embodiment of this application. As shown in FIG. 8, the blockchain network includes a witness subnetwork and a consensus subnetwork. Where: (1) The witness subnetwork includes one or more service nodes. That is, the service nodes are deployed in the witness subnetwork in a public network. The service node in the witness subnetwork mainly performs service execution, does not participate in committing consensus, and obtains, from the consensus subnetwork through identity authentication, block header data and some block data visible to the authorized. (2) The consensus subnetwork is a core network in the blockchain network, and is configured to perform committing consensus on the blockchain network. The consensus subnetwork includes one or more consensus nodes (or referred to as committers). Alternatively, the consensus subnetwork shown in FIG. 1d includes one or more consensus clusters, and consensus nodes running a blockchain consensus protocol are deployed in the consensus cluster, including the source consensus node and the service consensus node including the second service branch chain. Based on this, the foregoing cross-chain circulation process between the first service branch chain and the second service branch chain is performed in the consensus subnetwork in the double-layer network architecture. In general, the witness subnetwork and the consensus subnetwork are in different network environments. The witness subnetwork is in the public network, and the consensus subnetwork is in a private network. Because the consensus subnetwork is in the secure private network, security of mutual access in the consensus subnetwork is already ensured by using the consensus mechanism, and addition identity management and network control are not required. The service node is in the public network, and may be accessed by another uncertain network terminal. Therefore, access of the service node and another possible node to the consensus subnetwork is required to be strictly controlled.

Further, the foregoing witness subnetwork and consensus subnetwork may interact through a routing agent network (or referred to as a routing edge network) between the witness subnetwork and the consensus subnetwork. In some embodiments, the routing agent network belongs to the blockchain network. The routing agent network is configured to perform network isolation on the witness subnetwork and the consensus subnetwork. The routing agent network includes one or more routing agent nodes. Therefore, data transmitted by the service node in the witness subnetwork may be forwarded to the consensus node in the consensus subnetwork through the routing agent node. This may improve security of data in the consensus subnetwork. In this implementation, FIG. 9 is a more detailed schematic diagram of the architecture of the double-layer blockchain network according to an embodiment of this application.

Figure 9:
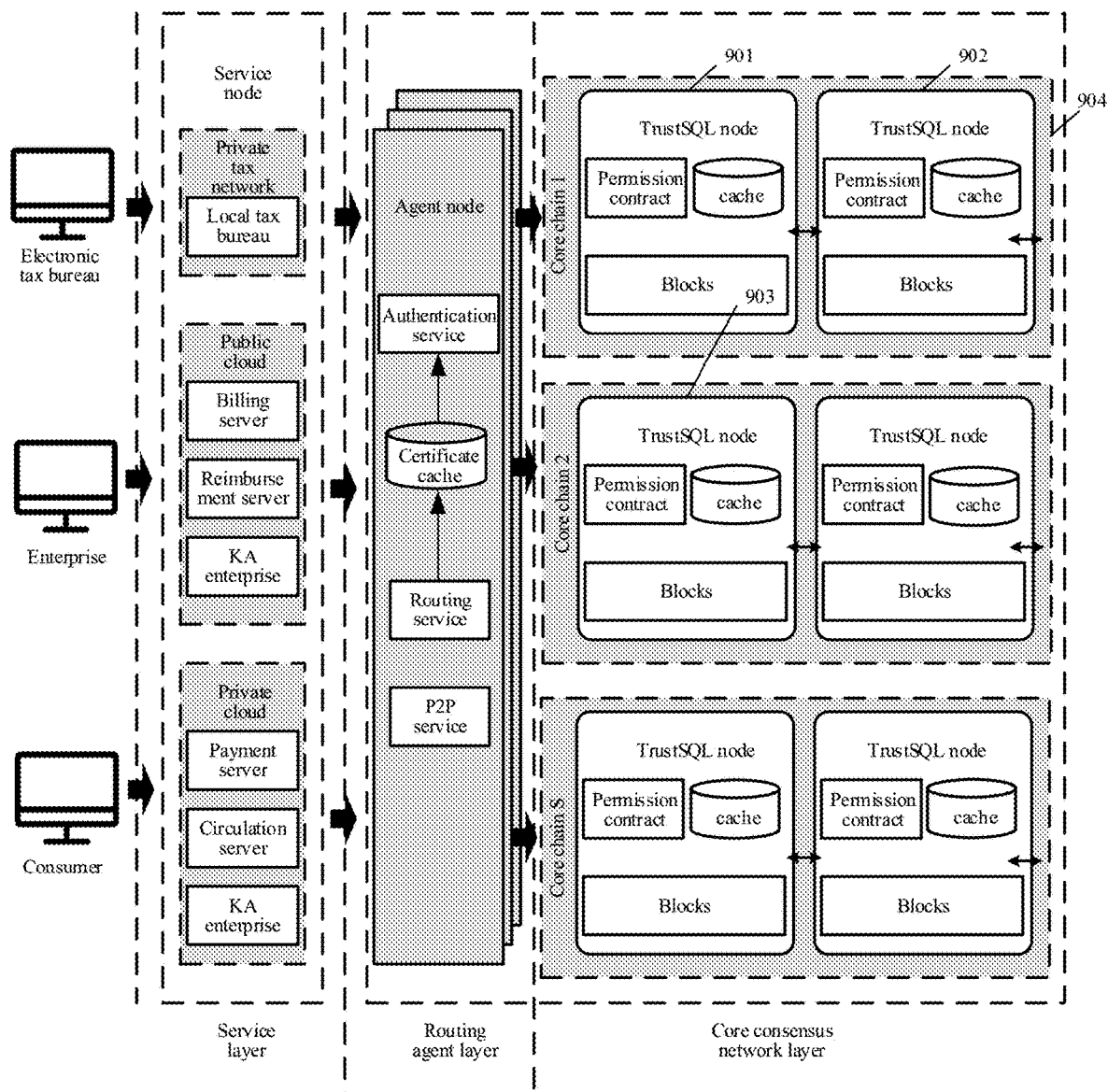
FIG. 9 is a schematic diagram of an architecture of a double-layer blockchain network according to an exemplary embodiment of this application.

As shown in FIG. 9, the blockchain network includes a service layer, a routing agent layer, and a core consensus network layer. The service layer, the routing agent layer, and the core consensus network layer form a complete blockchain service system. (1) The service layer is in the witness subnetwork. The service layer includes at least one service node. The service node may be a simplified payment verification (SPV) node. The SPV node maintains a normal unstructured P2P network. The service node may process tax (local tax bureau), bill (billing of an enterprise), and payment (cash flow of the enterprise) services, and the like. (2) The core consensus network layer is in the consensus subnetwork. The core consensus network layer includes a plurality of consensus nodes with a consensus function, for example, a consensus node 901, a consensus node 902, and a consensus node 903. (3) The routing agent layer includes at least one agent node. The agent node may provide a routing service, an authentication service, a certificate cache service, a P2P service, or the like. The service layer performs information interaction with the core consensus network layer through the routing agent layer. That is, the service layer commits service operation interaction to the core consensus network layer through the routing agent layer. Therefore, the routing agent layer isolates the service layer from the core consensus network layer.

It may be learned from the related description shown in FIG. 1*d* that the core consensus network layer (that is, the consensus subnetwork) may further include a plurality of consensus clusters. The core consensus network layer shown in FIG. 9 may include a consensus cluster 904. The consensus cluster 904 may include the consensus node 901 and the consensus node 902 that maintain a core chain 1 in this cluster. Whether the core consensus network layer includes a consensus node or a consensus cluster is not limited in this embodiment of this application. In addition, in this embodiment of this application, a plurality of consensus clusters are divided into a core consensus cluster and a branch chain consensus cluster based on whether a chain the consensus cluster maintains is a main service chain or a service branch chain. For related content about the core consensus cluster and the branch chain consensus cluster, refer to the related description about the implementation shown in FIG. 1*d*.

Figure 10A:
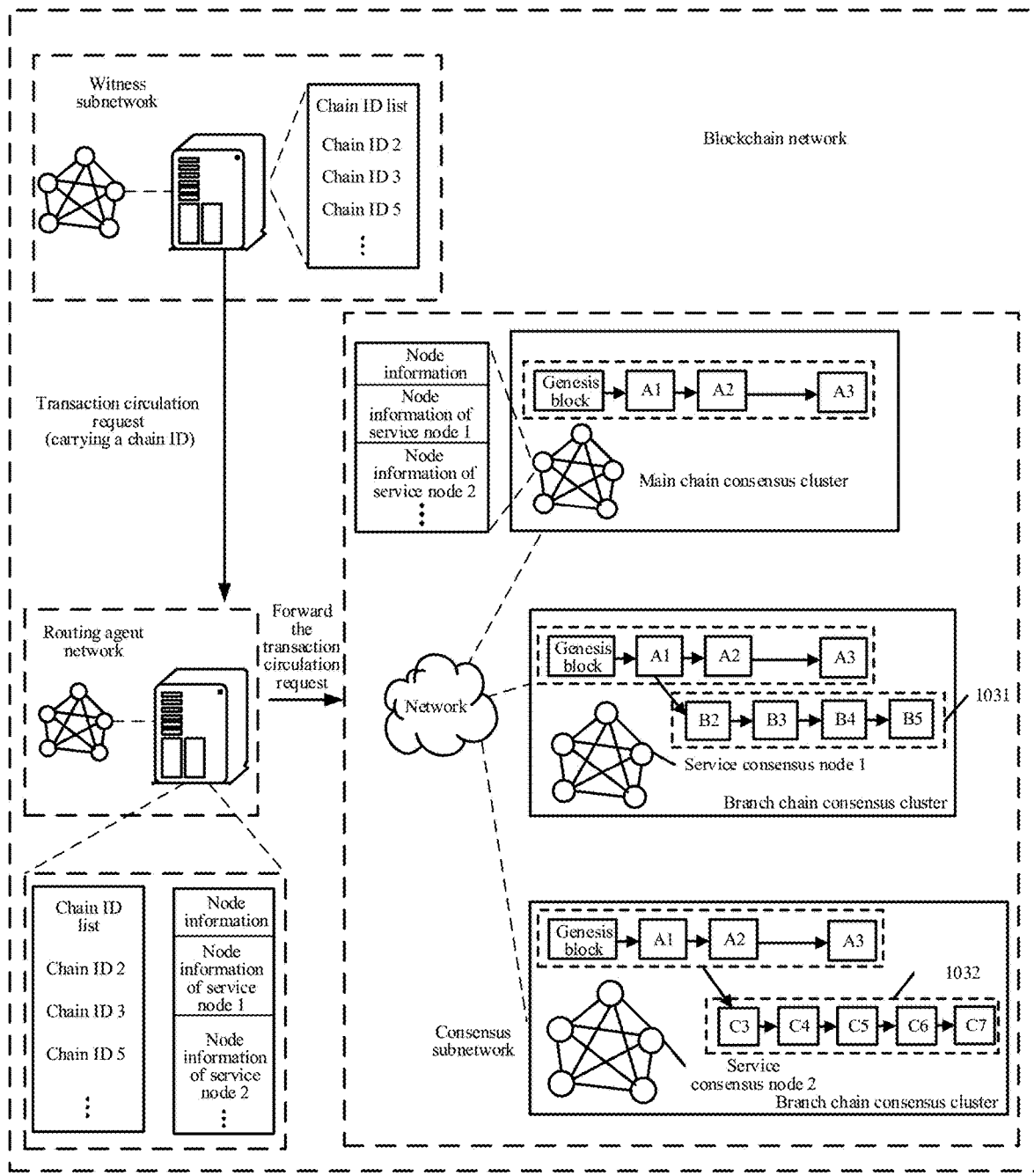
FIG. 10*a* is a schematic diagram of an architecture of a double-layer blockchain network according to an exemplary embodiment of this application.

The following describes the double-layer network architecture with reference to FIG. 10*a*. As shown in FIG. 10*a*, the blockchain network includes the witness subnetwork, the routing agent network, and the consensus subnetwork. (1) The service node (for example, the SPV node) in the witness subnetwork is dynamically configured with chain IDs of a main service chain and/or one or more service branch chains. Therefore, the service node in the witness subnetwork may participate in a service of the service branch chain (for example, access or store service data of a same service type as the service branch chain) using the chain ID. (2) Similarly, the main service chain in the consensus subnetwork is further registered with a node ID and an address of the service node in the witness subnetwork. The service branch chain may obtain a node ID and an address of a specific service node from the main service chain, and then synchronize service data stored on the service branch chain to the service node for local storage. (3) The routing agent network records node information of the consensus node in the consensus subnetwork. The node information may include information such as a node ID and a stored chain ID of a blockchain (for example, the main service chain or the service branch chain). When a routing gent node in the routing agent network encounters service data to be transmitted to the service branch chain, the service data may be directly forwarded to a corresponding service consensus node. When a routing gent node in the routing agent network does not encounter service data to be transmitted to the service branch chain, the routing agent node forwards the service data to a core consensus node that maintains the main service chain, and the core consensus node processes the service data (for example, forward to the corresponding service branch chain) based on a chain ID of each service branch chain derived from the main service chain.

Figure 10B:
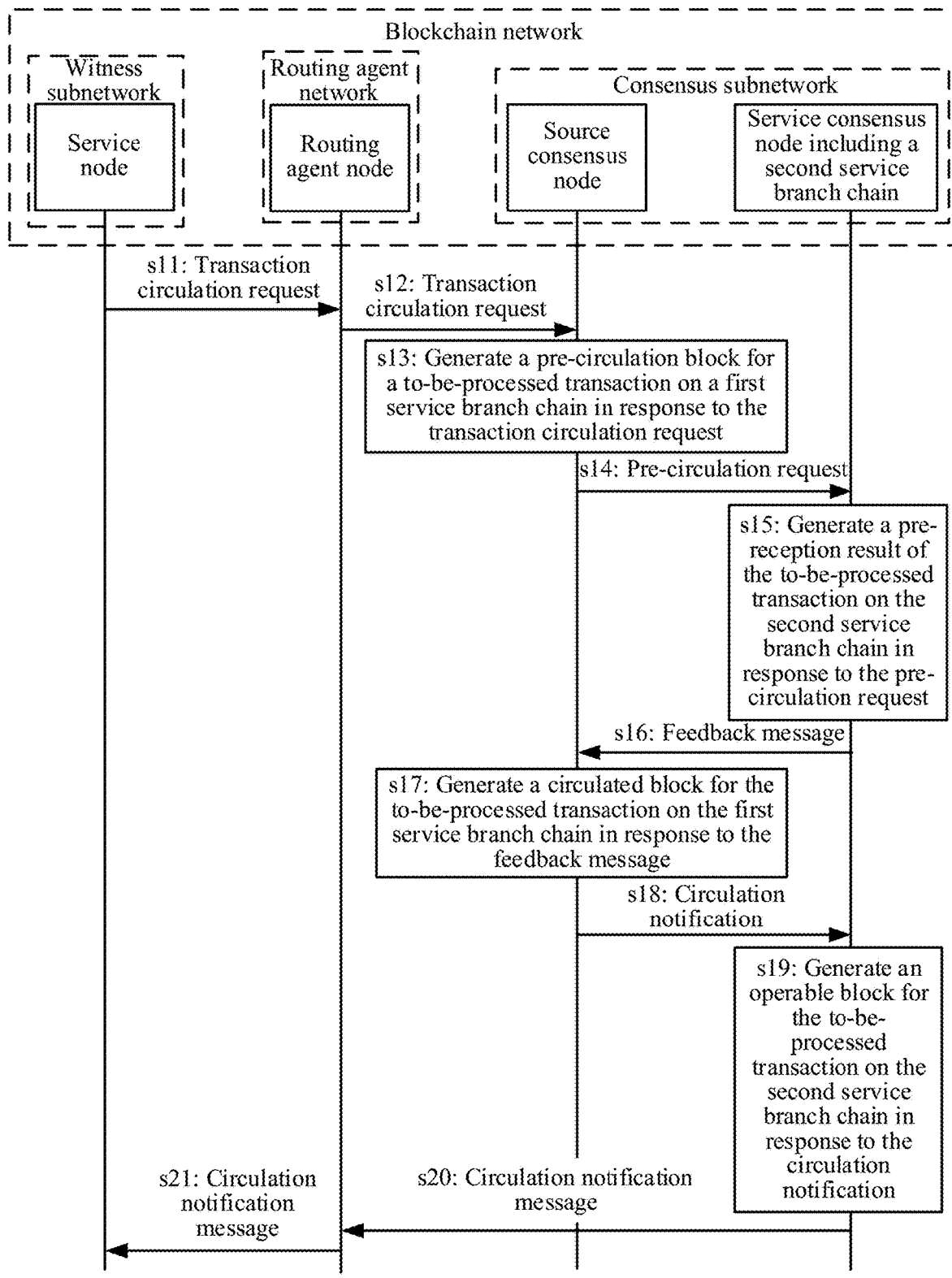
FIG. 10*b* is a schematic flowchart of a cross-blockchain processing method under a double-layer blockchain network according to an exemplary embodiment of this application.

Based on the description about the double-layer network architecture shown in FIG. 10*a*, the following describes, with reference to FIG. 10*a* and FIG. 10*b*, an implementation of the cross-blockchain processing method proposed in the embodiments of this application under the double-layer network architecture. The cross-blockchain processing method may include steps s11 to s21. The following describes each step.

s11: The service node in the witness subnetwork transmits a transaction processing request to the routing agent node in the routing agent network. The transaction processing request includes a derivation request and the transaction circulation request. The derivation request may be used for requesting for derivation of a new service branch chain from the service branch chain. In this implementation, the derivation request may carry the chain ID of the main service chain, service configuration information of the to-be-created new service branch chain, and the like. The transaction circulation request may be used for requesting transfer of the to-be-processed transaction from the first service branch chain to the second service branch chain. In this implementation, the transaction circulation request carries a transaction ID of the to-be-processed transaction (for example, an ID of the transaction, used for uniquely identifying the to-be-processed transaction), the chain ID of the first service branch chain, and the chain ID of the second service branch chain. For ease of description, the following uses an example in which the transaction processing request is the transaction circulation request for description.

s12: The routing agent network forwards the transaction circulation request to the consensus subnetwork. In an implementation, if the service node in the witness subnetwork already designates a consensus node to receive the transaction circulation request when transmitting the transaction circulation request to the routing agent network, the routing agent node may directly transmit the transaction circulation request to the designated consensus node in the consensus subnetwork based on the designated receiving object. A manner for designating the consensus node to receive the transaction circulation request may be carrying a node ID of the consensus node in the transaction circulation request. In another implementation, the routing agent node may directly transmit, to the consensus subnetwork based on the chain ID carried in the transaction circulation request, the transaction circulation request to a consensus node that maintains a chain corresponding to the chain ID. For example, the chain ID is an ID of the service branch chain 1031, and the service branch chain 1031 is maintained by a branch chain consensus cluster 1001 (as shown in FIG. 10*a*). In this case, the routing agent network may directly transmit the transaction circulation request to a service consensus node in the branch chain consensus cluster 1001, for example, a service consensus node 1 (referred to as the "source consensus node" in this application). In another implementation, the routing agent network may transmit the transaction circulation request to the fixed core consensus node that maintains the main service chain in the consensus subnetwork, and the core consensus node invokes, in response to the transaction circulation request, the corresponding service branch to perform a cross-chain circulation operation on the to-be-processed transaction.

It is to be noted that A specific transmission manner in which the routing agent network forwards the transaction circulation request is not limited in this embodiment of this application. In addition, considering security of the consensus subnetwork, the routing agent network is introduced in this embodiment of this application to perform network isolation on the witness subnetwork and the consensus subnetwork. However, in actual applications, the witness subnetwork may directly communicate with the consensus subnetwork. That is, the routing agent network is not required to implement communication between the witness subnetwork and the consensus subnetwork.

s13: The source consensus node receives the transaction circulation request forwarded by the routing agent network, and generates the pre-circulation block for the to-be-processed on the first service branch chain in response to the transaction circulation request. In other words, in addition to detecting that the life cycle of the to-be-processed transaction in the operable state on the first service branch chain satisfies the transaction circulation condition, the foregoing transaction circulation event may include determining existence of the transaction circulation event when the source consensus node receives the transaction circulation request forwarded by the routing agent network for the to-be-processed transaction. It is to be noted that for an implementation in which the source consensus node generates the pre-circulation block for the to-be-processed transaction on the first service branch chain in response to the transaction circulation event, refer to the related description about the implementation shown in step S201 in the embodiment shown in FIG. 2.

s14: The source consensus node transmits, based on the pre-circulation block, the pre-circulation request to the service consensus node including the second service branch chain.

s15: The service consensus node including the second service branch chain generates the pre-reception result of the to-be-processed transaction on the second service branch chain in response to the pre-circulation request.

s16: The service consensus node including the second service branch chain feeds back, to the source consensus node, the feedback message generated based on the pre-reception result.

s17: The source consensus node generates, in response to the feedback message after the pre-reception result is successfully validated, the circulated block corresponding to the to-be-processed transaction on the first service branch chain.

s18: The source consensus node transmits the circulation notification to the service consensus node including the second service branch chain.

s19: The service consensus node including the second service branch chain generates the operable block for the to-be-processed transaction on the second service branch chain in response to the circulation notification.

It is to be noted that for an implementation process of steps s14 to s19, refer to the implementation processes/process of the embodiments/embodiment shown in FIG. 2 and/or FIG. 5.

s20: The service consensus node including the second service branch chain transmits a circulation notification message to the routing agent node. The circulation notification message is used for indicating whether circulation of the to-be-processed succeeds or fails.

s21: The routing agent node forwards the circulation notification message to the service node. The service consensus node including the second service branch chain stores a node ID and an address of the service node (or the SPV node). Therefore, the service consensus node including the second service branch chain may directly transmit the circulation notification message to the service node based on the node ID and the address of the service node. An implementation in which the service consensus node including the second service branch chain returns the circulation notification message is not limited in this embodiment of this application.

In summary, in one aspect, in the double-layer network architecture proposed in this embodiment of this application, the routing agent network performs network isolation on the witness subnetwork and the consensus subnetwork, so that security of service data stored in the consensus subnetwork is improved to some extent. In the other aspect, in this embodiment of this application, the to-be-processed transaction and the operation permission for the operation on the to-be-processed transaction may be circulated (or transferred) from the first service branch chain to the second service branch chain, thereby implementing cross-chain circulation of the to-be-processed transaction between different service branch chains. In addition, a status (for example, the pre-circulation state, the pre-reception state, and the circulated state) corresponding to the to-be-processed transaction is set in each circulation step to keep status change consistency of the to-be-processed transaction in the circulation process and ensure uniqueness and security of the operation on the to-be-processed transaction in the circulation process.

The foregoing describes the method of the embodiments of this application in detail. For ease of implementing the foregoing method of the embodiments of this application better, correspondingly, the following provides an apparatus of the embodiments of this application.

Figure 11:
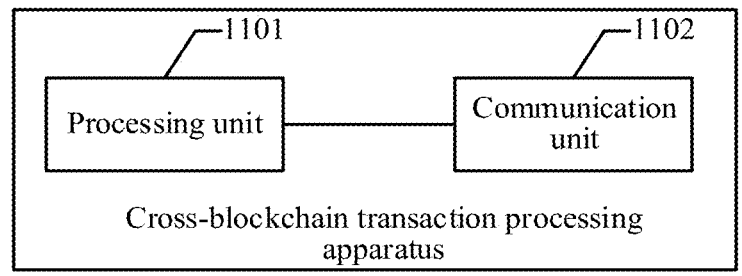
FIG. 11 is a schematic diagram of a structure of a cross-blockchain transaction processing apparatus according to an exemplary embodiment of this application.

FIG. 11 is a schematic diagram of a structure of a cross-blockchain transaction processing apparatus according to an exemplary embodiment of this application. The cross-blockchain transaction processing apparatus may be a computer program (including program code) run in a source consensus node. The cross-blockchain transaction processing apparatus may be configured to perform some or all steps in the method embodiments shown in FIG. 2 and FIG. 10b. The cross-blockchain transaction processing apparatus includes the following units.

A processing unit 1101 is configured to generate a pre-circulation block for a to-be-processed transaction on a first service branch chain in response to detecting a transaction circulation event. The transaction circulation event is used for transferring the to-be-processed transaction from the first service branch chain to a second service branch chain. A communication unit 1102 is configured to transmit, based on an ID of the pre-circulation block, a pre-circulation request to a service consensus node including the second service branch chain. The pre-circulation request is used for requesting the service consensus node including the second service branch chain to generate a pre-reception result of the to-be-processed transaction on the second service branch chain. The processing unit 1101 is further configured to generate a circulated block corresponding to the to-be-processed transaction on the first service branch chain. The communication unit 1102 is further configured to transmit, based on an ID of the circulated block, a circulation notification to the service consensus node including the second service branch chain. The circulation notification is used for informing the service consensus node including the second service branch chain to generate an operable block for the to-be-processed transaction on the second service branch chain.

In an implementation, the processing unit 1101 is further configured to receive a feedback message that is returned by the service consensus node including the second service branch chain and that is generated based on the pre-reception result, and generate the circulated block corresponding to the to-be-processed transaction on the first service branch chain after the feedback message is successfully validated.

In an implementation, when configured to receive the feedback message that is returned by the service consensus node including the second service branch chain and that is generated based on the pre-reception result, the processing unit 1101 is further configured to validate, in response to receiving, within first timeout waiting duration after transmission of the pre-circulation request, the feedback message returned by the service consensus node including the second service branch chain based on the pre-reception result, a status of the to-be-processed transaction on the second service branch chain based on the feedback message to obtain a pre-reception validation result.

In an implementation, the pre-reception result includes status information of the to-be-processed transaction on the second service branch chain and pre-reception signature information corresponding to the to-be-processed transaction. The pre-reception signature information is generated by the service consensus node including the second service branch chain by signing the to-be-processed transaction with a node private key of the service consensus node including the second service branch chain. When configured to validate the status of the to-be-processed transaction on the second service branch chain based on the feedback message to obtain the pre-reception validation result, the processing unit 1101 is further configured to: obtain a node public key of the service consensus node including the second service branch chain; perform signature verification on the pre-reception signature information using the node public key of the service consensus node including the second service branch chain to obtain a signature verification result; and generate the pre-reception validation result based on the status information and the signature verification result. The pre-reception validation result indicates that the pre-reception result is successfully validated in a case that the status information indicates that the to-be-processed transaction is in a pre-reception state on the second service branch chain and the signature verification result indicates that signature verification of the pre-reception signature information succeeds.

In an implementation, the processing unit 1101 is further configured to: perform a status rollback process on the to-be-processed transaction on the first service branch chain in response to detecting a status rollback condition of the to-be-processed transaction, the status rollback process including setting the status of the to-be-processed transaction on the first service branch chain to be an operable state, and the status rollback condition including that the pre-reception result is not received within first timeout waiting duration, or the pre-reception result is received within first timeout waiting duration, and the pre-reception result fails to be validated; and generate the operable block based on the to-be-processed transaction in the operable state after the status rollback process, and store the operable block to the first service branch chain.

In an implementation, when configured to generate the pre-circulation block corresponding to the to-be-processed transaction on the first service branch chain, the processing unit 1101 is further configured to: perform a pre-circulation process on the to-be-processed transaction on the first service branch chain, the pre-circulation process including setting a status of the to-be-processed transaction on the first service branch chain to be a pre-circulation state; sign the to-be-processed transaction in the pre-circulation state after the pre-circulation process to generate pre-circulation signature information; and perform a packaging process on the to-be-processed transaction in the pre-circulation state and the pre-circulation signature information to obtain the pre-circulation block.

In an implementation, the pre-circulation state of the to-be-processed transaction on the first service branch chain is locked. The locked to-be-processed transaction may not be transferred to a third service branch chain. The third service branch chain is different from the second service branch chain.

In an implementation, a manner for determining that the transaction circulation event is detected includes: determining, in response to receiving a transaction circulation request forwarded by a routing agent network for the to-be-processed transaction, that the transaction circulation event is detected, the routing agent network belonging to a blockchain network, the blockchain network including a witness subnetwork and a consensus subnetwork, the witness subnetwork including one or more service nodes, the consensus subnetwork including one or more consensus nodes, and the routing agent network (such as a routing agent node thereof) being configured to perform network isolation on the witness subnetwork and the consensus subnetwork; or determining, in response to detecting that a life cycle of the to-be-processed transaction in an operable state on the first service branch chain satisfies a transaction circulation condition, that the transaction circulation event is detected.

According to an embodiment of this application, each unit in the cross-blockchain transaction processing apparatuses shown in FIG. 11 may exist respectively or be combined into one or more other units. Alternatively, a certain (or some) unit in the units may be further split into a plurality of smaller function units, thereby implementing the same operations without affecting the technical effects of the embodiments of this application. The units are divided based on logical functions. In actual applications, a function of one unit may be realized by a plurality of units, or functions of a plurality of units may be realized by one unit. In another embodiment of this application, the cross-blockchain transaction processing apparatus may include other units. In actual applications, these functions may be realized cooperatively by the other units, and may be realized cooperatively by a plurality of units. According to another embodiment of this application, a computer program (including program code) capable of performing each step involved in the corresponding methods shown in FIG. 2 and FIG. 10*b* may be run in a general-purpose computing device, for example, a computer, including a processing element and a storage element, for example, a central processing unit (CPU), a random access memory (RAM), or a read-only memory (ROM), to structure the cross-blockchain transaction processing apparatus shown in FIG. 11 and implement the cross-blockchain transaction processing method in the embodiments of this application. The computer program may be recorded in, for example, a computer-readable recording medium and loaded, through the computer-readable recording medium, and run in the computing device.

In this embodiment of this application, the processing unit 1101 may circulate the to-be-processed transaction from the first service branch chain to the second service branch chain in response to the detected transaction circulation event for transferring the to-be-processed transaction from the first service branch chain to the second service branch chain, thereby implementing cross-chain circulation of the to-be-processed transaction between different service branch chains. In addition, a corresponding circulation state (for example, the pre-circulation state, the pre-reception state, and the circulated state) is set for the to-be-processed transaction on a service branch chain in each circulation step in a circulation process of the to-be-processed transaction. For example, in cross-chain circulation, the pre-reception state may be first set for the to-be-processed transaction in the operable state on the first service branch chain, to indicate that the to-be-processed transaction is prepared to be circulated to the second service branch chain. Then, a status of the to-be-processed transaction is set to be the pre-reception state on the second service branch chain, to indicate that the second service branch chain is ready to receive the to-be-processed transaction. This ensures status change consistency of the to-be-processed transaction in the circulation process, and ensures uniqueness and security of the operation on the to-be-processed transaction in the circulation process.

Figure 12:
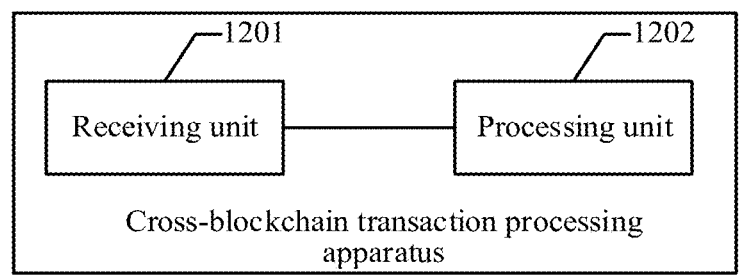
FIG. 12 is a schematic diagram of a structure of a cross-blockchain transaction processing apparatus according to an exemplary embodiment of this application.

FIG. 12 is a schematic diagram of a structure of a cross-blockchain transaction processing apparatus according to an exemplary embodiment of this application. The cross-blockchain transaction processing apparatus may be a computer program (including program code) run in a service consensus node including a second service branch chain. The cross-blockchain transaction processing apparatus may be configured to perform some or all steps in the method embodiments shown in FIG. 5 and FIG. 10*b*. The cross-blockchain transaction processing apparatus includes the following units.

A receiving unit 1201 is configured to receive a pre-circulation request transmitted by a source consensus node. The pre-circulation request is used for requesting for generation of a pre-reception result of a to-be-processed transaction on the second service branch chain. A processing unit 1202 is configured to generate the pre-reception result for the to-be-processed transaction in a case that the to-be-processed transaction is successfully validated in response to the pre-circulation request. The processing unit 1202 is further configured to return, to the source consensus node, a feedback message generated based on the pre-reception result, such that the source consensus node generates, based on the feedback message, a circulated block corresponding to the to-be-processed transaction on a first service branch chain in the source consensus node. The processing unit 1202 is further configured to generate an operable block for the to-be-processed transaction on the second service branch chain in response to a circulation notification returned by the source consensus node. The circulation notification is returned by the source consensus node based on the circulated block. The circulation notification is used for notifying to generate the operable block for the to-be-processed transaction on the second service branch chain.

In an implementation, the processing unit 1202 is further configured to: obtain, in response to that the circulation notification returned by the source consensus node is not received within second timeout waiting duration, an access cycle for accessing the source consensus node; and transmit an access request to the source consensus node at an interval of the access cycle, the access request being used for requesting the source consensus node to return the circulation notification, until the circulation notification returned by the source consensus node is received.

In an implementation, when configured to generate the pre-reception result for the to-be-processed transaction on the second service branch chain, the processing unit 1202 is further configured to: set a status of the to-be-processed transaction to be a pre-reception state on the second service branch chain;

sign the to-be-processed transaction in the pre-reception state to obtain pre-reception signature information; and perform a packaging process on the to-be-processed transaction in the pre-reception state and the pre-reception signature information to obtain the pre-reception result.

In an implementation, in a case that the to-be-processed transaction is in the pre-reception state on the second service branch chain, use of transaction information of the to-be-processed transaction is not allowed. The use includes access, processing, and transfer.

According to an embodiment of this application, each unit in the cross-blockchain transaction processing apparatuses shown in FIG. 12 may exist respectively or be combined into one or more other units. Alternatively, a certain (or some) unit in the units may be further split into a plurality of smaller function units, thereby implementing the same operations without affecting the technical effects of the embodiments of this application. The units are divided based on logical functions. In actual applications, a function of one unit may be realized by a plurality of units, or functions of a plurality of units may be realized by one unit. In another embodiment of this application, the cross-blockchain transaction processing apparatus may include other units. In actual applications, these functions may be realized cooperatively by the other units, and may be realized cooperatively by a plurality of units. According to another embodiment of this application, a computer program (including program code) capable of performing each step involved in the corresponding methods shown in FIG. 5 and FIG. 10*b* may be run in a general-purpose computing device, for example, a computer, including a processing element and a storage element, for example, a CPU, a RAM, or a ROM, to structure the cross-blockchain transaction processing apparatus shown in FIG. 12 and implement the cross-blockchain transaction processing method in the embodiments of this application. The computer program may be recorded in, for example, a computer-readable recording medium and loaded, through the computer-readable recording medium, and run in the computing device.

In this embodiment of this application, the processing unit 1202 may circulate the to-be-processed transaction and an operation permission for an operation on the to-be-processed transaction between different service branch chains in response to a transaction circulation event for transferring the to-be-processed transaction from the first service branch chain to the second service branch chain, thereby implementing cross-chain circulation of the to-be-processed transaction. In addition, the status of the to-be-processed transaction on a service branch chain is locked in each circulation step in a circulation process of the to-be-processed transaction. For example, when the status of the to-be-processed transaction is set to be a pre-circulation state on the first service branch chain, the pre-circulation state of the to-be-processed transaction on the first service branch chain is locked, such that the to-be-processed transaction in the pre-circulation state cannot be circulated to another service branch chain (for example, a service branch chain different from the second service branch chain). This ensures status change consistency of the to-be-processed transaction. In addition, the cross-chain process of the to-be-processed transaction is not controlled dependently on a third-party service center, which reduces cross-chain transaction circulation costs. Moreover, in this embodiment of this application, the timeout rollback mechanism is further introduced to improve fault tolerance and robustness of the cross-chain transaction circulation process. Therefore, the cross-blockchain processing solution provided in this embodiment of this application may be applied to transaction circulation in a complex blockchain network, and extensibility of an application scenario corresponding to the solution is improved.

Figure 13:
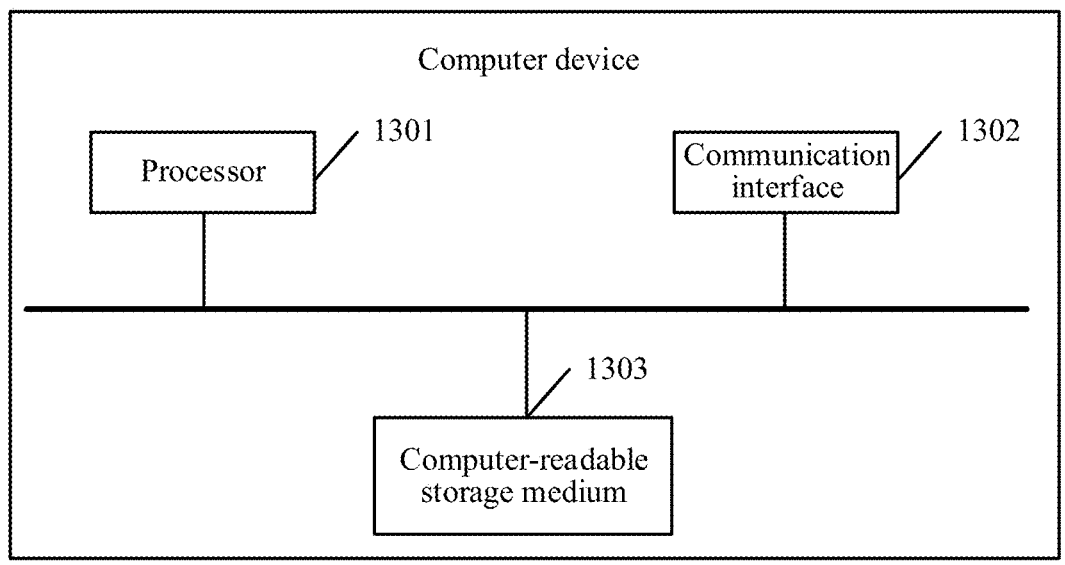
FIG. 13 is a schematic diagram of a structure of a computer device according to an exemplary embodiment of this application.

FIG. 13 is a schematic diagram of a structure of a computer device according to an exemplary embodiment of this application. The computer device may be a node connected to a blockchain. Each node is physically formed by one or more computer devices through mapping based on a virtualization technology. For example, the computer device may be a source consensus node or a service consensus node including a second service branch chain in another embodiment. The source consensus node may be a server connected to a blockchain network, or a user terminal connected to a blockchain network. Similarly, the service consensus node including the second service branch chain may be a server connected to the blockchain network, or a user terminal connected to the blockchain network. With reference to FIG. 13, the computer device includes a processor 1301, a communication interface 1302, and a computer-readable storage medium 1303. The processor 1301, the communication interface 1302, and the computer-readable storage medium 1303 may be connected through a bus or in another manner. The communication interface 1302 is configured to receive and send data. The computer-readable storage medium 1303 may be stored in a memory of the computer device, such as a terminal. The computer-readable storage medium 1303 is configured to store a computer program. The computer program includes program instructions. The processor 1301 is configured to execute the program instruction stored in the computer-readable storage medium 1303. As a computing core and a control core of the computer device, the processor 1301 (or referred to as a CPU) is suitable for implementing one or more instructions, specifically suitable for loading and executing the one or more instructions, thereby implementing corresponding method processes or corresponding functions.

An embodiment of this application also provides a computer-readable storage medium (memory). As a memory device in the computer device, the computer-readable storage medium is configured to store a program and data. It may be understood that the computer-readable storage medium herein may include a built-in storage medium in the computer device, or may certainly include an extended storage medium supported by the computer device. The computer-readable storage medium provides storage space storing a processing system of the computer device. Moreover, one or more instructions suitable for the processor 1301 to load and execute are also stored in the storage space, and these instructions may be one or more computer programs (including program code). It is to be noted that the computer-readable storage medium herein may be a high-speed RAM, or a non-volatile memory, for example, at least one disk memory. Optionally, the computer-readable storage medium may be at least one computer-readable storage medium far away from the processor.

In an embodiment, one or more instructions are stored in the computer-readable storage medium. The processor 1301 loads and executes the one or more instructions stored in the computer-readable storage medium, so as to implement the corresponding steps in the embodiment of the cross-blockchain transaction processing method. The processor 1301 loads and executes the one or more instructions stored in the computer-readable storage medium to implement the following steps:

generating a pre-circulation block for a to-be-processed transaction on a first service branch chain in response to detecting a transaction circulation event; the transaction circulation event being used for transferring the to-be-processed transaction from the first service branch chain to the second service branch chain; transmitting, based on an ID of the pre-circulation block, a pre-circulation request to the service consensus node including the second service branch, the pre-circulation request being used for requesting the service consensus node including the second service branch chain to generate a pre-reception result of the to-be-processed transaction; generating a circulated block corresponding to the to-be-processed transaction on the first service branch chain; and transmitting, based on an ID of the circulated block, a circulation notification to the service consensus node including the second service branch chain, the circulation notification being used for informing the service consensus node including the second service branch chain to generate an operable block for the to-be-processed transaction on the second service branch chain.

In an implementation, when generating the circulated block corresponding to the to-be-processed transaction on the first service branch chain, the processor 1301 loads and executes the one or more instructions stored in the computer-readable storage medium to implement the following step: receiving a feedback message that is returned by the service consensus node including the second service branch chain and that is generated based on the pre-reception result, and generating the circulated block corresponding to the to-be-processed transaction on the first service branch chain after the feedback message is successfully validated.

In an implementation, when receiving the feedback message returned by the service consensus node including the second service branch chain based on the pre-reception result, the processor 1301 loads and executes the one or more instructions stored in the computer-readable storage medium to implement the following step:

validating, in response to receiving, within first timeout waiting duration after transmission of the pre-circulation request, the feedback message returned by the service consensus node including the second service branch chain based on the pre-reception result, a status of the to-be-processed transaction on the second service branch chain based on the feedback message to obtain a pre-reception validation result.

In an implementation, the pre-reception result includes status information of the to-be-processed transaction on the second service branch chain and pre-reception signature information corresponding to the to-be-processed transaction. The pre-reception signature information is generated by the service consensus node including the second service branch chain by signing the to-be-processed transaction with a node private key of the service consensus node including the second service branch chain. In an implementation, when validating the status of the to-be-processed transaction on the second service branch chain based on the feedback message to obtain the pre-reception validation result, the processor 1301 loads and executes the one or more instructions stored in the computer-readable storage medium to implement the following steps:

obtaining a node public key of the service consensus node including the second service branch chain; performing signature verification on the pre-reception signature information using the node public key of the service consensus node including the second service branch chain to obtain a signature verification result; and generating the pre-reception validation result based on the status information and the signature verification result, the pre-reception validation result indicating that the pre-reception result is successfully validated in a case that the status information indicates that the to-be-processed transaction is in a pre-reception state on the second service branch chain and the signature verification result indicates that signature verification of the pre-reception signature information succeeds.

In an implementation, the processor 1301 loads and executes the one or more instructions stored in the computer-readable storage medium to further implement the following steps:

performing a status rollback process on the to-be-processed transaction on the first service branch chain in response to detecting a status rollback condition of the to-be-processed transaction, the status rollback process including setting the status of the to-be-processed transaction on the first service branch chain to be an operable state, and the status rollback condition including that the pre-reception result is not received within first timeout waiting duration, or the pre-reception result is received within first timeout waiting duration, and the pre-reception result fails to be validated; and generating the operable block based on the to-be-processed transaction in the operable state after the status rollback process, and storing the operable block to the first service branch chain.

In an implementation, when generating the pre-circulation block for the to-be-processed transaction on the first service branch chain, the processor 1301 loads and executes the one or more instructions stored in the computer-readable storage medium to implement the following steps:

performing a pre-circulation process on the to-be-processed transaction on the first service branch chain, the pre-circulation process including setting a status of the to-be-processed transaction on the first service branch chain to be a pre-circulation state; signing the to-be-processed transaction in the pre-circulation state after the pre-circulation process to generate pre-circulation signature information; and performing a packaging process on the to-be-processed transaction in the pre-circulation state and the pre-circulation signature information to obtain the pre-circulation block.

In an implementation, the pre-circulation state of the to-be-processed transaction on the first service branch chain is locked. The locked to-be-processed transaction may not be transferred to a third service branch chain. The third service branch chain is different from the second service branch chain.

In an implementation, a manner for determining that the transaction circulation event is detected includes: determining, in response to receiving a transaction circulation request forwarded by a routing agent network for the to-be-processed transaction, that the transaction circulation event is detected, the routing agent network belonging to a blockchain network, the blockchain network including a witness subnetwork and a consensus subnetwork, the witness subnetwork including one or more service nodes, the consensus subnetwork including one or more consensus nodes, and the routing agent network (such as a routing agent node thereof) being configured to perform network isolation on the witness subnetwork and the consensus subnetwork; or determining, in response to detecting that a life cycle of the to-be-processed transaction in an operable state on the first service branch chain satisfies a transaction circulation condition, that the transaction circulation event is detected.

In another embodiment, one or more instructions are stored in the computer-readable storage medium. The processor 1301 loads and executes the one or more instructions stored in the computer-readable storage medium, so as to implement the corresponding steps in the embodiment of the cross-blockchain transaction processing method. The processor 1301 loads and executes the one or more instructions stored in the computer-readable storage medium to implement the following steps:

receiving a pre-circulation request transmitted by a source consensus node, the pre-circulation request being used for requesting for generation of a pre-reception result of a to-be-processed transaction on a second service branch chain; generating the pre-reception result for the to-be-processed transaction in a case that the to-be-processed transaction is successfully validated in response to the pre-circulation request; returning, to the source consensus node, a feedback message generated based on the pre-reception result, such that the source consensus node generates, based on the feedback message, a circulated block corresponding to the to-be-processed transaction on a first service branch chain in the source consensus node; and generating an operable block for the to-be-processed transaction on the second service branch chain in response to a circulation notification returned by the source consensus node, the circulation notification being returned by the source consensus node based on the circulated block, and the circulation notification being used for notifying to generate the operable block for the to-be-processed transaction on the second service branch chain.

In an implementation, the processor 1301 loads and executes the one or more instructions stored in the computer-readable storage medium to further implement the following steps:

obtaining, in response to that the circulation notification returned by the source consensus node is not received within second timeout waiting duration, an access cycle for accessing the source consensus node; and transmitting an access request to the source consensus node at an interval of the access cycle, the access request being used for requesting the source consensus node to return the circulation notification, until the circulation notification returned by the source consensus node is received.

In an implementation, when generating the pre-reception result for the to-be-processed transaction on the second service branch chain, the processor 1301 loads and executes the one or more instructions stored in the computer-readable storage medium to implement the following steps:

setting a status of the to-be-processed transaction to be a pre-reception state on the second service branch chain; signing the to-be-processed transaction in the pre-reception state to obtain pre-reception signature information; and performing a packaging process on the to-be-processed transaction in the pre-reception state and the pre-reception signature information to obtain the pre-reception result.

In an implementation, in a case that the to-be-processed transaction is in the pre-reception state on the second service branch chain, use of transaction information of the to-be-processed transaction is not allowed. The use includes access, processing, and transfer.

In this embodiment of this application, the source consensus node may circulate the to-be-processed transaction from the first service branch chain to the second service branch chain in response to the detected transaction circulation event for transferring the to-be-processed transaction from the first service branch chain to the second service branch chain, thereby implementing cross-chain circulation of the to-be-processed transaction between different service branch chains. In addition, a corresponding circulation state (for example, the pre-circulation state, the pre-reception state, and the circulated state) is set for the to-be-processed transaction on a service branch chain in each circulation step in a circulation process of the to-be-processed transaction. For example, in cross-chain circulation, the pre-reception state may be first set for the to-be-processed transaction in the operable state on the first service branch chain, to indicate that the to-be-processed transaction is prepared to be circulated to the second service branch chain. Then, a status of the to-be-processed transaction is set to be the pre-reception state on the second service branch chain, to indicate that the second service branch chain is ready to receive the to-be-processed transaction. This ensures status change consistency of the to-be-processed transaction in the circulation process, and ensures uniqueness and security of an operation on the to-be-processed transaction in the circulation process.

An embodiment of this application also provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the cross-blockchain transaction processing method.

A person of ordinary skill in the art may realize that the units and the algorithm steps in each example described with reference to the embodiments disclosed in this application may be implemented by electronic hardware or a combination of computer software and electronic hardware. Whether these functions are executed by hardware or software depends on specific applications and design constraints of the technical solutions. A person skilled in the art may use different methods to implement the described functions for each particular application, but it is not to be considered that such implementation goes beyond the scope of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the processes or functions according to embodiments of this application are all or partially generated. The computer may be a general-purpose computer, a dedicated computer, a computer network, or another programmable device. The computer instructions may be stored in a computer-readable storage medium or transmitted through the computer-readable storage medium. The computer instructions may be transmitted from one website, computer, server, or data center to another in a wired (for example, a coaxial cable, an optical fiber, or a digital subscriber line (DSL)) or wireless (for example, infrared, radio, or microwave) manner. The computer-readable storage medium may be any available medium accessible by a computer, or a data processing device, for example, a server or a data center, integrating one or more available media. The available medium may be a magnetic medium (for example, a floppy disk, a hard disk, or a magnetic tape), an optical medium (for example, a digital video disk (DVD)), a semiconductor medium (for example, a solid state disk (SSD)), or the like.

The foregoing is merely implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cross-blockchain transaction processing method, applied to a computer device and comprising:
   generating a pre-circulation block for a transaction on a first service branch chain in response to detecting a transaction circulation event, the transaction circulation event being used for transferring the transaction from the first service branch chain to a second service branch chain;
   transmitting, based on an identifier (ID) of the pre-circulation block, a pre-circulation request to a service consensus node including the second service branch chain, the pre-circulation request being used for requesting the service consensus node including the second service branch chain to generate a pre-reception result of the transaction on the second service branch chain;
   in response to detecting a status rollback condition of the transaction,
      performing a status rollback process on the transaction on the first service branch chain, wherein: the status rollback process includes setting a status of the transaction on the first service branch chain to be an operable state; and the status rollback condition includes that no feedback message is received within a timeout waiting duration, or a feedback message is received within the timeout waiting duration but the feedback message fails to be validated; and
      generating the operable block based on the transaction in the operable state after the status rollback process, and storing the operable block to the first service branch chain;
   in response to a feedback message returned by the service consensus node,
      generating a circulated block corresponding to the transaction on the first service branch chain; and
      transmitting, based on an ID of the circulated block, a circulation notification to the service consensus node including the second service branch chain, the circulation notification being used for informing the service consensus node including the second service branch chain to generate an operable block for the transaction on the second service branch chain.

2. The method according to claim 1, wherein generating the circulated block corresponding to the transaction on the first service branch chain includes:
   receiving the feedback message that is returned by the service consensus node including the second service branch chain and that is generated based on the pre-reception result; and
   generating the circulated block corresponding to the transaction on the first service branch chain after the feedback message is successfully validated.

3. The method according to claim 2, wherein receiving the feedback message includes:
   validating, in response to receiving the feedback message within a timeout waiting duration after transmission of the pre-circulation request, a status of the transaction on the second service branch chain based on the feedback message to obtain a pre-reception validation result.

4. The method according to claim 3, wherein:
   the pre-reception result includes status information of the transaction on the second service branch chain and pre-reception signature information corresponding to the to-be-processed transaction, the pre-reception signature information being generated by the service consensus node including the second service branch chain by signing the transaction with a node private key of the service consensus node including the second service branch chain; and validating the status of the transaction on the second service branch chain based on the feedback message to obtain the pre-reception validation result includes:
   obtaining a node public key of the service consensus node including the second service branch chain;
   performing signature verification on the pre-reception signature information using the node public key of the service consensus node including the second service branch chain to obtain a signature verification result; and
   generating the pre-reception validation result based on the status information and the signature verification result, the pre-reception validation result indicating that the pre-reception result is successfully validated in response to the status information indicating that the transaction is in a pre-reception state on the second service branch chain and the signature verification result indicating that signature verification of the pre-reception signature information succeeds.

5. The method according to claim 1, wherein generating the pre-circulation block includes:
   performing a pre-circulation process on the transaction on the first service branch chain, the pre-circulation process including setting a status of the transaction on the first service branch chain to be a pre-circulation state;
   signing the to-be-processed transaction in the pre-circulation state after the pre-circulation process to generate pre-circulation signature information; and
   performing a packaging process on the to-be-processed transaction in the pre-circulation state after the pre-circulation process and the pre-circulation signature information to obtain the pre-circulation block.

6. The method according to claim 5, wherein the pre-circulation state of the transaction on the first service branch chain is locked, and the locked transaction is not able to be transferred to a third service branch chain different from the second service branch chain.

7. The method according to claim 1, further comprising:
   determining, in response to receiving a transaction circulation request forwarded by a routing agent network for the transaction, that the transaction circulation event is detected, the routing agent network belonging to a blockchain network, the blockchain network including a witness subnetwork and a consensus subnetwork, the witness subnetwork including one or more service nodes, the consensus subnetwork including one or more consensus nodes, and the routing agent network being configured to isolate the witness subnetwork and the consensus subnetwork; or
   determining, in response to detecting that a life cycle of the transaction in an operable state on the first service branch chain satisfies a transaction circulation condition, that the transaction circulation event is detected.

8. A non-transitory computer-readable storage medium storing a computer program that, when executed by a processor, causes the processor to implement the cross-blockchain transaction processing method according to claim 1.

9. A computer device comprising:
   a processor; and
   a non-transitory computer-readable storage medium storing a computer program that, when executed by the processor, causes the process to:
     generate a pre-circulation block for a transaction on a first service branch chain in response to detecting a transaction circulation event, the transaction circulation event being used for transferring the transaction from the first service branch chain to a second service branch chain;
     transmit, based on an identifier (ID) of the pre-circulation block, a pre-circulation request to a service consensus node including the second service branch chain, the pre-circulation request being used for requesting the service consensus node including the second service branch chain to generate a pre-reception result of the transaction on the second service branch chain;
     in response to detecting a status rollback condition of the transaction,
       perform a status rollback process on the transaction on the first service branch chain, wherein: the status rollback process includes setting a status of the transaction on the first service branch chain to be an operable state; and the status rollback condition includes that no feedback message is received within a timeout waiting duration, or a feedback message is received within the timeout waiting duration but the feedback message fails to be validated; and
       generate the operable block based on the transaction in the operable state after the status rollback process, and store the operable block to the first service branch chain;
     in response to a feedback message returned by the service consensus node,
       generate a circulated block corresponding to the transaction on the first service branch chain; and
       transmit, based on an ID of the circulated block, a circulation notification to the service consensus node including the second service branch chain, the circulation notification being used for informing the service consensus node including the second service branch chain to generate an operable block for the transaction on the second service branch chain.

10. The computer device according to claim 9, wherein the computer program further causes the processor to:
   receive the feedback message that is returned by the service consensus node including the second service branch chain and that is generated based on the pre-reception result; and
   generate the circulated block corresponding to the transaction on the first service branch chain after the feedback message is successfully validated.

11. The computer device according to claim 10, wherein the computer program further causes the processor to:
   validate, in response to receiving the feedback message within a timeout waiting duration after transmission of the pre-circulation request, a status of the transaction on the second service branch chain based on the feedback message to obtain a pre-reception validation result.

12. The computer device according to claim 11, wherein:
the pre-reception result includes status information of the transaction on the second service branch chain and pre-reception signature information corresponding to the to-be-processed transaction, the pre-reception signature information being generated by the service consensus node including the second service branch chain by signing the transaction with a node private key of the service consensus node including the second service branch chain; and the computer program further causes the processor to:
- obtain a node public key of the service consensus node including the second service branch chain;
- perform signature verification on the pre-reception signature information using the node public key of the service consensus node including the second service branch chain to obtain a signature verification result; and
- generate the pre-reception validation result based on the status information and the signature verification result, the pre-reception validation result indicating that the pre-reception result is successfully validated in response to the status information indicating that the transaction is in a pre-reception state on the second service branch chain and the signature verification result indicating that signature verification of the pre-reception signature information succeeds.

13. A cross-blockchain transaction processing method, applied to a computer device and comprising:
- receiving a pre-circulation request transmitted by a source consensus node including a first service branch chain, the pre-circulation request being used for requesting for generation of a pre-reception result of a transaction on a second service branch chain;
- generating the pre-reception result for the transaction in response to the transaction being successfully validated in response to the pre-circulation request, comprising:
  - setting a status of the transaction to be a pre-reception state on the second service branch chain;
  - signing the transaction in the pre-reception state to obtain pre-reception signature information; and
  - performing a packaging process on the transaction in the pre-reception state and the pre-reception signature information to obtain the pre-reception result;
- returning, to the source consensus node, a feedback message generated based on the pre-reception result, such that the source consensus node generates, based on the feedback message, a circulated block corresponding to the transaction on the first service branch chain; and
- generating an operable block for the transaction on the second service branch chain in response to a circulation notification returned by the source consensus node based on the circulated block, the circulation notification being used for notifying to generate the operable block for the transaction on the second service branch chain.

14. The method according to claim 13, further comprising:
- obtaining, in response to not receiving the circulation notification from the source consensus node within a timeout waiting duration, an access cycle for accessing the source consensus node; and
- transmitting an access request to the source consensus node at an interval of the access cycle until the circulation notification returned by the source consensus node is received, the access request being used for requesting the source consensus node to return the circulation notification.

15. The method according to claim 13, wherein in response to the transaction being in the pre-reception state on the second service branch chain, use of transaction information of the transaction is not allowed, and the use includes at least one of access, processing, or transfer.

16. A computer device comprising:
- a processor; and
- a computer-readable storage medium storing a computer program that, when executed by the processor, causes the processor to implement the cross-blockchain transaction processing method according to claim 13.

17. A non-transitory computer-readable storage medium storing a computer program that, when executed by a processor, causes the processor to implement the cross-blockchain transaction processing method according to claim 13.

* * * * *